(12) United States Patent
Fuller, III et al.

(10) Patent No.: US 8,051,148 B2
(45) Date of Patent: **\*Nov. 1, 2011**

(54) DETERMINING DIFFERENCES BETWEEN CONFIGURATION DIAGRAMS

(75) Inventors: David W Fuller, III, Austin, TX (US); Mohammed Kamran Shah, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1305 days.

This patent is subject to a terminal disclaimer.

(21) Appl. No.: 11/329,789

(22) Filed: Jan. 10, 2006

(65) Prior Publication Data
US 2006/0168183 A1    Jul. 27, 2006

Related U.S. Application Data

(60) Provisional application No. 60/643,677, filed on Jan. 13, 2005.

(51) Int. Cl.
  *G06F 15/177* (2006.01)
  *G09G 3/24* (2006.01)
  *G06F 11/00* (2006.01)
(52) U.S. Cl. ............................ 709/220; 345/73; 714/705
(58) Field of Classification Search .................. 709/249, 709/200, 220–222; 707/200
See application file for complete search history.

(56) References Cited

U.S. PATENT DOCUMENTS

| | | | |
|---|---|---|---|
| 4,991,176 A | 2/1991 | Dahbura et al. | |
| 5,481,741 A | 1/1996 | McKaskle et al. | |
| 5,633,813 A | 5/1997 | Srinivasan | |
| 5,781,720 A | 7/1998 | Parker et al. | |
| 5,861,882 A | 1/1999 | Sprenger et al. | |
| 5,878,050 A | 3/1999 | Brahme et al. | |
| 5,974,254 A | 10/1999 | Hsu | |

(Continued)

FOREIGN PATENT DOCUMENTS
WO    WO 8907377 A1 *  8/1989

OTHER PUBLICATIONS

Using Simulink Version 4, Jun. 2001, pp. 1, 3.2, 4.5, 12.14-21; MathWorks V.*

(Continued)

*Primary Examiner* — Ashok B. Patel
*Assistant Examiner* — Evans Desrosiers
(74) *Attorney, Agent, or Firm* — Meyertons Hood Kivlin Kowert & Goetzel, P.C.; Jeffrey C. Hood; Mark S. Williams

(57) ABSTRACT

System and method for determining and/or merging differences between configuration diagrams. First information is received regarding a first configuration diagram comprising a first plurality of nodes and graphically representing a first system, and second information is received regarding a second configuration diagram comprising a first plurality of nodes and graphically representing a second system. At least a portion of the nodes may correspond to hardware devices, programs, and/or configuration data of the respective systems, and may be interconnected. The first and second information is analyzed to determine and/or merge differences between the first configuration diagram and the second configuration diagram, e.g., differences between hardware, software, configuration, and/or connectivity, e.g., by traversing the configuration diagrams or data structures representing the diagrams. An indication of the differences and/or a merged configuration diagram may be displayed on a display device, e.g., where the differences are indicated graphically, e.g., via highlighting.

42 Claims, 15 Drawing Sheets

U.S. PATENT DOCUMENTS

| | | | |
|---|---|---|---|
| 6,138,270 A | 10/2000 | Hsu | |
| 6,249,882 B1 | 6/2001 | Testardi | |
| 6,327,617 B1 * | 12/2001 | Fawcett | 709/219 |
| 6,463,552 B1 | 10/2002 | Jibbe | |
| 6,507,842 B1 | 1/2003 | Grey et al. | |
| 6,546,524 B1 | 4/2003 | Chankramath et al. | |
| 6,622,298 B1 | 9/2003 | Stamm | |
| 6,647,513 B1 | 11/2003 | Hekmatpour | |
| 6,654,911 B1 | 11/2003 | Miles | |
| 7,069,343 B2 * | 6/2006 | Goringe et al. | 709/249 |
| 7,120,545 B2 | 10/2006 | Benvenga et al. | |
| 7,420,573 B1 | 9/2008 | Aberg et al. | |
| 2002/0188701 A1 * | 12/2002 | Brown et al. | 709/220 |
| 2003/0097438 A1 * | 5/2003 | Bearden et al. | 709/224 |
| 2003/0101021 A1 * | 5/2003 | Shah et al. | 702/186 |
| 2003/0191825 A1 * | 10/2003 | Miyazaki et al. | 709/220 |
| 2004/0075680 A1 * | 4/2004 | Grace et al. | 345/734 |
| 2004/0153869 A1 | 8/2004 | Marinelli et al. | |
| 2005/0240640 A1 | 10/2005 | Kaler et al. | |
| 2006/0156294 A1 | 7/2006 | Fuller, III et al. | |
| 2006/0168182 A1 | 7/2006 | Fuller, III et al. | |
| 2006/0168183 A1 | 7/2006 | Fuller, III et al. | |
| 2006/0190105 A1 | 8/2006 | Hsu et al. | |

OTHER PUBLICATIONS

Kim Letkeman; "Comparing and merging UML models in IBM Rational Software Architect: Part 1"; Jul. 12, 2005; 29 pages.
"Model Based Collaboration Made Easy"; I-Logix RealTimes quarterly newsletter; Dec. 2005; 5 pages; vol. V, Issue 17.
"SimDiff 2.0"; 1 page; ENSOFT datasheet.
"SimDiff User Manual Version 2.0"; Apr. 12, 2006; 17 pages; ENSOFT.
"Simulink Performance Tools 1"; Oct. 2002; 4 pages; The MathWorks.
"Using Simulink Version 5"; Jul. 2002; 50 pages; The MathWorks.
Akhil Mehra, John Grundy and John Hosking; "A Generic Approach to Supporting Diagram Differencing and Merging for Collaborative Design"; International Conference on Automated Software Engineering; Nov. 2005; 10 pages.
"Using Simulink, Merging Model Differences"; 2 pages; printed from the Internet: http://www.caspur.it/risorse/softappl/doc/matlab_help/toolbox/simulink/ug/performance_tools15.html.
"Using Simulink, The Graphical Merge Tool Window"; 2 pages; printed from the Internet: http://www.caspur.it/risorse/softappl/doc/matlab_help/toolbox/simulink/ug/performance_tools12.html.
"Using Simulink, Navigating Model Differences"; 1 page; printed from the Internet: www.caspur.it/risorse/softappl/doc/matlab_help/toolbox/simulink/ug/performance_tools14.html.
"Release Notes for Release 12.1, Graphical Merge Tool"; 1 page; printed from the Internet: http://www.phys.ufl.edu/docs/matlab/base/relnotes/slperfrm.html.
Prior Art Statement.
International search report and written opinion for application No. PCT/US2006/001335 mailed Jun. 21, 2006.
Jeff Kramer, Jeff Magee and Ken Ng; "Graphical Configuration Programming"; Computer; Oct. 1999; pp. 53-65; vol. 22, Issue 10; Los Alamitos, CA, U.S.A.
Henrik Baerbak Christensen; "Modularisation of Software Configuration Management"; Joint Modular Languages Conference; Sep. 6, 2000; pp. 1-13.
J.R. Ullmann. An algorithm for subgraph isomorphism. J. ACM, 23(1):31-42, 1976.
F. Luellau, T. Hoepken, and E. Barke. A technology independent block extraction algorithm. In 21st Proceedings of the Design Automation Conference on Design automation, pp. 610-615. IEEE Press, 1984.
M. Takashima, A. Ikeuchi, S. Kojima, T. Tanaka, T. Saitou, and J. Ichi Sakata. A circuit comparison system with rule-based functional isomorphism checking. In Proceedings of the 25th ACM/IEEE conference on Design automation, pp. 512-516. IEEE Computer Society Press, 1988.
Ebeling C. Gemini II: A Second Generation Layout Validation Program, Proceedings of the Conference on Computer Aided Design (ICCAD), pp. 322-235, 1988.
J. Laski and W. Szermer. Identification of program modifications and its applications in software maintenance. In Proceedings of IEEE Conference on Software Maintenance, pp. 282-290, Orlando, FL, Nov. 1992.
Samuel Bates and Susan Horwitz, "Incremental Program Testing using Program Dependence Graphs," Proceedings ACM Conference on Principles of Programming Languages, 1993.
Susan Horwitz, "Identifying the Semantic and Textual Differences Between Two Versions of a Program," Proceedings of the ACM SIGPLAN' 90 Conferencing on Programming Language, 1990.
H. Kalviainen and E. Oja. Comparisons of attributed graph matching algorithms for computer vision. In STeP-90 Finnish Articifical Intelligence Symposium, University of Oulu. pp. 354-368, 1990.
Edward H. Sussenguth, Jr. A Graph-Theoretic Algorithm for Matching Chemical Structures. p. 36-43, 1964.
Stephen H. Unger. GIT—A Heuristic Program for Testing Pairs of Directed Line Graphs for Isomorphism. Communications of the ACM, vol. 7, No. 1, Jan. 1964. p. 26-34.
D.G. Corneil and C.C. Gotlieb. An Efficient Algorithm for Graph Isomorphism. Journal of the Association for Computing Machinery, vol. 17, No. 1, Jan. 1970. p. 51-64.
H.G. Barrow, A.P. Ambler, and R.M. Burstall. "Some Techniques for Recognising Structures in Pictures," in Frontiers of Pattern Recognition, 1972.
A.T. Berztiss. A Backtrack Procedure for Isomorphism of Directed Graphs. Journal of the Association for Computing Machinery, vol. 20, No. 3, Jul. 1973. p. 365-377.
Ronald C. Read and Derek G. Corneil. The Graph Isomorphism Disease. The Journal of Graph Theory, vol. 1, 1977. p. 339-363.
D.G. Corneil and D.G. Kirkpatrick. A Theoretical Analysis of Various Heuristics for the Graph Isomorphism Problem. Society for Industrial and Applied Mathematics, vol. 9, No. 2, May 1990. p. 281-297.
Wen-Hsiang Tsai and King-Sun Fu. Error-Correcting Isomorphisms of Attributed Relational Graphs for Pattern Analysis. IEEE Transactions on Systems, Man, and Cybernetics, vol. 9, No. 12, Dec. 1979. p. 757-768.
Brendan D. McKay. Practical Graph Isomorphism. Congressus Numerantium, vol. 30, 1981. p. 45-87.
I. Ablasser and U. Jager. Circuit Recognition and Verification Based on Layout Information. 18th Design Automation Conference, 1981. p. 684-689.
Miles Ohlrich, Carl Ebeling, Eka Ginting, and Lisa Sather. SubGemini: Identifying SubCircuits using a Fast Subgraph Isomorphism Algorithm. 30th ACM/IEEE Design Automation Conference, 1993. p. 31-37.
Communication from foreign patent office for application No. PCT/US2006/001334, mailed on Oct. 2, 2006.
Susan Horwitz, Jan Prins and Thomas Reps; "Integrating Noninterfering Versions of Programs"; ACM Transactions on Programming Languages and Systems (TOPLAS); Jul. 1989; pp. 345-387; vol. 11, Issue 3.
Tom Mens; "Conditional Graph Rewriting as a Domain-Independent Formalism for Software Evolution"; Proceedings of the International Workshop on Applications of Graph Transformations with Industrial Relevance; 2000; 17 pages.
Tom Mens; "A State-of-the-Art Survey on Software Merging"; IEEE Transactions on Software Engineering; May 2002; pp. 449-462; vol. 28, No. 5.
"Using Simulink Version 4", Jun. 2001, pp. 1, 3.2, 4.5, 12.14-21; Mathworks.
"Using SimuLink Version 5", 2002, 50 pages.
"SimuLink Performance Tools", Website, 2002, 4 pages.
"SimDiff User Manual", Ensoft Corporation, Apr. 12, 2006, 17 pages.
International Search Report and Written Opinion for Application No. PCT/US2006/001333 mailed Jul. 3, 2006.
Johnson, Laura, "Test and Measurement—Understanding Test Executives," Webpage www.testandmeasurement.com.content/news/ , Oct. 16, 2000, pp. 1-9.
International Search Report and Written Opinion for Application No. PCT/US2006/001333, mailed Jul. 3, 2006; 13 pages.

* cited by examiner

DETERMINING DIFFERENCES BETWEEN CONFIGURATION DIAGRAMS

PRIORITY DATA

This application claims benefit of priority to U.S. Provisional Application Ser. No. 60/643,677, titled "Determining and Merging Differences Between Configuration Diagrams", filed on Jan. 13, 2005, whose inventors were David W. Fuller III and Mohammed Kamran Shah.

FIELD OF THE INVENTION

The present invention relates to the field of system configuration, and more particularly to a system and method for determining and displaying differences between configuration diagrams.

DESCRIPTION OF THE RELATED ART

With the advent of networked computer systems, there has been a trend in computer software to provide more distributed software applications. For example, in some fields developers are attempting to distribute software applications among two or more nodes or computer systems in a network, wherein the application may comprise a plurality of different software programs executing in a plurality of different computer systems or other devices.

Measurement and automation systems are moving toward computer based systems wherein a computer system performs much of the processing, analysis, or control for measurement and automation applications. Measurement and automation systems are also moving toward network-based or distributed systems, wherein a plurality of network-based devices operate together to perform a desired measurement and/or automation function. Various new intelligent devices are also starting to appear in measurement and automation systems, such as smart sensors, smart cameras, smart motion control devices, smart distributed data acquisition devices, computer based instrument cards, PXI and VXI systems which may include intelligent controllers or reconfigurable devices, programmable logic controllers (PLCs), etc.

Computer-based measurement and automation systems which employ intelligent devices have become increasingly desirable in view of the increasing complexity of measurement and automation tasks, and the variety of intelligent or programmable instruments and devices available for use. However, due to the wide variety of possible testing and control situations and environments, and also the wide array of instruments or devices available, it is often necessary for a user to develop custom programs to control a desired system.

Increasingly, computers are required to be used and programmed by those who are not highly trained in computer programming techniques. This is particularly true in the measurement and automation fields, where engineers are often required to develop a test, measurement or automation application to accomplish a certain objective. As a result, in many cases it is extremely difficult for a user to be able to create various computer programs and distribute these programs among devices in a distributed system.

Graphical tools are increasingly used to develop, manage, and operate systems, e.g., distributed systems, for test and measurement, data acquisition, process control, man machine interface (MMI), supervisory control and data acquisition (SCADA) applications, modeling, simulation, image processing/machine vision applications, motion control, and e-commerce, among others. Examples of such graphical tools include graphical programming systems, such as the LabVIEW graphical programming system provided by National Instruments Corporation, and configuration diagrams, which graphically represent hardware and/or software systems, e.g., in the form of a graph of interconnected icons representing hardware and/or software.

Various techniques for creation and use of configuration diagrams are described in U.S. patent application Ser. No. 10/113,987 titled "A Configuration Diagram Which Displays a Configuration of a System" whose inventors are Jeffrey L. Kodosky, Darshan Shah and Steven W. Rogers, and U.S. patent application Ser. No. 10/338,512 titled "Network-Based System for Analyzing a Client System and Generating a Configuration Diagram which Describes the Client System" whose inventors are Mohammed Kamran Shah, David W Fuller III, Jeffrey N. Correll and Brian H. Sierer, both of which are hereby incorporated by reference.

SUMMARY OF THE INVENTION

Embodiments of a system and method for determining and/or merging differences between configuration diagrams are described. Information regarding a first configuration diagram may be received, where the first configuration diagram represents a first system. Information regarding a second configuration diagram may also be received, where the second configuration diagram represents a second system. A configuration diagram may comprise a plurality of nodes representing components in the represented system, and optionally interconnections representing physical, logical, and/or data coupling between the components or resources. Note that the first and second systems may be of any type, e.g., the first system and the second system may each comprise one or more of: an industrial automation system, a process control system, and a test and measurement system, among others. In a preferred embodiment, at least one of the systems comprises a measurement system.

In various embodiments, the information regarding the first and second configuration diagrams may be any type of information related to or characterizing the configuration diagrams and/or the represented systems. For example, in some embodiments the information may include the configuration diagrams themselves. In other embodiments, the information regarding a configuration diagram may include one or more of: an abstract representation of the configuration diagram, e.g., a data structure or description specifying the plurality of nodes, and optionally, interconnections, component or resource attributes, e.g., identification, sub-components, configuration data, version information, descriptions, deployment, and so forth. Thus, the information regarding the each configuration diagram may include one or more of: the configuration diagram, a graph of the configuration diagram, a description of the configuration diagram, and a data structure specifying the configuration diagram. The information for each configuration diagram may include information related to the corresponding system's components or resources, and may also include information related to the connectivity or associations between the system components or resources.

It should be noted that in preferred embodiments, the systems and methods described herein may be implemented in a networked client/server system, where, for example, various portions of the described functionality may be performed by software executing on the client and/or the server systems. Thus, the method may include the client computer system connecting to the server system over a network, e.g., the Internet, where the first and/or the second information may be provided to the server by the client system, and/or extracted by the server system from the client system, etc.

In another embodiment, the user may provide information describing or specifying a task or system functionality, e.g., via a GUI displayed on the client system and provided by the client system and/or the server computer system, e.g., via a GUI displayed on a vendor's website. The method may then include automatically or programmatically determining a system suitable for performing the specified task, i.e., determining the first information. For example, based on the information describing or specifying the task or desired functionality, the server (or client) may query a database of configuration diagrams to determine or select a configuration diagram corresponding to the appropriate system.

Henceforth, in this document the components or resources comprised in or represented in the configuration diagrams may be referred to by the term "component", although it should be noted that as used herein, component may mean any or all of a hardware component or group of components, a device or group of devices, a software component, program, or group of programs, data (e.g., configuration data), or any other aspect of a system or system element.

The received first and second information may be analyzed to determine differences between the first and second configuration diagrams. In a preferred embodiment, the determined differences correspond to or reflect differences between the systems respectively represented by the first and second configuration diagrams.

The determination of the differences between the first and second configuration diagrams may be performed in a variety of different manners. In some embodiments, the analyzing may include creating one or more data structures which include information regarding the first plurality of nodes in the first configuration diagram and the second plurality of nodes in the second configuration diagram, where determining differences includes comparing the one or more data structures to determine the differences. For example, in one embodiment, the one or more data structures may each comprise directed graphs including a plurality of vertices connected by edges, where each of the vertices represents one of the nodes in a respective one of the first and second configuration diagrams. The directed graphs may then be analyzed to determine the differences, e.g., the configuration diagrams, or representations thereof, may be traversed or "walked", to enumerate their respective components and connections. For example, if the configuration diagrams are represented by respective graphs, each graph may be traversed, where each node and connection (if any) is recorded. The resulting lists may then be compared to determine the differences. Of course, depending upon the type and form of the received information, any other type of comparison may be made as appropriate to determine the differences.

In some embodiments, determining the differences and/or matches between the configuration diagrams may include determining differences and/or matches between components in the corresponding systems. For example, in some embodiments, differences and/or matches between hardware devices (if any) comprised in the first and second systems may include differences and/or matches in one or more of: number and types of the hardware devices, sub-components of the hardware devices, programs stored on the hardware devices and configuration of the hardware devices, among others. For example, consider the case where the same type of hardware device is included in both systems, but where one or more aspects of the hardware devices differ in the two systems, e.g., software (e.g., software programs and/or versions), configuration data, expansion cards, hardware versions, calibration dates, etc. The method may include determining all or part of these component differences and/or matches.

In some embodiments, during the analysis of the information regarding the configuration diagrams, e.g., during traversal of the configuration diagrams, each component or information representing or relating to each component, may be analyzed to determine any distinctions between otherwise similar or identical components. Note that these sub-component differences may be between hardware, software, data, e.g., configuration data, and/or any other aspect of the respective components.

In one embodiment, the differences and/or matches may be determined in accordance with specified criteria or guidelines. In other words, analyzing the first and second information to determine differences and/or matches between the configuration diagrams may be performed in accordance with specified difference and/or match criteria, such as, for example, difference/match tolerance levels, category or type, cost, and performance, among others. In some embodiments, the criteria may be specified by the user. Thus, the method may include receiving user input specifying the difference and/or match criteria, e.g., via a graphical user interface (GUI).

Finally, an indication of the determined differences between the first and second configuration diagrams may be displayed on a display device, e.g., a computer monitor, printer, etc. There are numerous ways in which the determined differences may be displayed or indicated, any of which may be used to display the differences. For example, in one embodiment, a "difference" configuration diagram may be displayed that includes only those nodes and connections not common to both configuration diagrams. In another embodiment, a configuration diagram may be displayed that displays at least a subset of a set union or "merge" of the component/resource nodes of the two configuration diagrams, where the nodes and/or connections are graphically displayed to indicate whether they are common to both diagrams, and/or if not common, to which system they belong, e.g., by highlighting, color, outline, style, labels, etc. In other words, nodes and/or connections common to both configuration diagrams, and/or those exclusive to each configuration diagram may be graphically displayed in such as way as to distinguish between them. Thus, in some embodiments, the configuration diagrams may be merged to generate a merged configuration diagram, and the results displayed. Further details of configuration diagram merging are provided below.

In various embodiments, displaying an indication of the differences on a display device may include one or more of: displaying a textual description of each of said differences, displaying at least one of said first and second configuration diagrams and graphically indicating, e.g., highlighting, at least a subset of the differences between said first and second configuration diagrams, and displaying a merged configuration diagram comprising at least a subset of a union of the first and second configuration diagrams and graphically indicating, e.g., highlighting, the differences between the first and second configuration diagrams.

As noted above, in some embodiments, the configuration diagrams may be merged. In other words, rather than simply determining differences, the received information may be analyzed to merge the first and second configuration diagrams, thereby generating a merged configuration diagram, representing a "merged" system comprising at least a subset of a union (in the set-theoretic sense) of the respective components of the first and second systems.

In some embodiments, analyzing the first and second information to merge the first configuration diagram and the second configuration diagram may include analyzing and merging one or more of: matches and differences between hardware devices comprised in the first and second systems, matches and differences between programs comprised in the first and second systems, and matches and differences between configuration data comprised in the first and second systems, among others.

In some embodiments, the merged configuration diagram may be generated as the first and second diagrams are traversed or walked, obviating the intermediate lists. Note that where the same components are encountered in the first and second configuration diagrams, only one corresponding component may be added to the merged configuration diagram, thereby avoiding redundancies in the merged configuration diagram. As noted above, in some embodiments, the received information may comprise lists of components or resources, as well as lists of connections between the components or resources. The analysis may then include analyzing and merging the lists, then generating the merged configuration diagram based on the merged list. Of course, depending upon the type and form of the received information, any other type of comparison and analysis may be made as appropriate to generate the merged configuration diagram.

The generated merged configuration diagram may then be displayed on a display device, e.g., a computer monitor, printer, etc. There are numerous ways in which the merged configuration diagram may be displayed, any of which may be used as desired. For example, in one embodiment, the merged configuration diagram may be displayed where nodes and/or connections common to both configuration diagrams, and/or those exclusive to each configuration diagram may be graphically displayed in such as way as to distinguish between them, e.g., via highlighting, color, line-style, labels, and so forth. In other words, nodes and/or connections representing components, and optionally interconnections, common to both systems, and/or those exclusive to each system may be graphically displayed in such as way as to distinguish between them. For example, components only in the first configuration diagram may be shown with a first color, components only in the second configuration diagram may be shown with a second color, and components common to both may be shown in a third color. Note that in various embodiments, the merged configuration diagram may comprise a new configuration diagram, or may be generated by modifying a pre-existing configuration diagram, e.g., the first or second configuration diagram.

In some embodiments, the merged configuration diagram may be indicated textually, e.g., as lists or tables of components and optionally, their connectivity. For example, names of components (and optionally, connectivity) may be grouped according to their configuration diagram affiliation, including a "common" group comprising those common to both configuration diagrams. Any other means of displaying the merged configuration diagram are also contemplated, including, for example, combinations of textual and graphical representations. For example, displaying the merged configuration diagram may also include graphically indicating the matches and differences between the first and second configuration diagrams in the merged configuration diagram, and/or displaying a textual description of matches and differences between the first and second configuration diagrams. In one embodiment, graphically indicating the matches and differences between the first and second configuration diagrams in the merged configuration diagram may include highlighting the differences (or matches) between the first and second configuration diagrams in the merged configuration diagram.

The determined differences and/or matches may be used for any of a variety of purposes. For example, the first configuration diagram may comprise a desired system specification, and the second configuration diagram may represent a user's actual system. The user may wish to modify the actual system in accordance with the specification. In some embodiments, the determined differences and/or matches may be used to place an order for any components needed to bring the actual system into accordance with the specification, i.e., the first configuration diagram. Thus, the method may further include providing means for enabling the user to acquire needed but missing components for the actual system (e.g., represented by the second configuration diagram).

For example, in one embodiment, software executing on a client computer system, e.g. the users computer system, and/or software executing on a server computer, e.g. coupled to the client computer, may analyze the determined differences and may automatically initiate acquisition and/or purchase of the missing (one or more) components. In one embodiment, the software may automatically order the components without user input, e.g., via the network (e.g., the Internet), for example, if the user's billing or payment information (e.g., credit card number, credit account number, etc.) is already stored or available to the software. In other words, the system may comprise an e-commerce system that automatically (or at user initiation) orders and purchases the needed components based on the determined differences. In other embodiments, the user may be presented with a GUI, e.g., displayed on the client system and provided by the server and/or the client system, prompting the user for input regarding completion of the actual system. For example, the GUI may display the first configuration diagram, e.g., highlighting those components that are missing in the actual system, and may prompt the user with a "Complete the system?" message or equivalent. In response to a positive answer from the user, a search for and/or order of the missing components may then be performed. For example, one or more quotes for each missing component may be presented to the user, including, for example, cost, vendor, delivery times, and/or any other information useful for making a purchase decision, where the quotes may be retrieved from a database, via a network search engine, or any other source of quote information. As another example, the user may click on each of the missing components in the diagram, thereby invoking respective options related to that component, such as, for example, searching for similar components, ordering the component, etc. The GUI may also facilitate user entry or specification of payment information for acquiring the components where necessary. Note that in some cases, one or more of the needed components may be free, e.g., software components available for download from a server, etc.

Where multiple versions of a component are available, selection or priority criteria, possibly specified by the user, may be used to select among the possible components. The selection criteria may specify desirable attributes such as cost, performance, manufacturer/vendor, delivery time and/or means, and so forth, which may guide in the selection of the components.

In other embodiments, at least some user input may be required to acquire the components. For example, in one embodiment, the client computer system may contact a server computer system to acquire the desired components. In one embodiment, a GUI may be presented to the user on a display device of the client computer system, where the GUI may be provided by the client computer system and/or by the server.

In one embodiment, the user may specify which components are needed, although in other embodiments, the GUI may indicate to the user which components (or component types) are needed by the actual system (or the second configuration diagram) to bring it into compliance with the specification, i.e., the first configuration diagram.

Thus, the GUI may present user-selectable options for acquiring the components. As one example, the GUI may simply provide a list of the needed components (possibly numerous versions of each) and contact information for sources or vendors of the components, e.g., names, addresses, telephone numbers, websites or URLs, and so forth. As another example, the GUI may present various ordering options and/or means for acquiring the components, including, for example, user-selectable links for placing orders over a network, e.g., the Internet, or for downloading software and/or data. In some embodiments, the GUI may present information to help the user select components, such as, for example, cost, vendor, manufacturer, technical specifications, order fulfillment times, and so forth. The GUI may also facilitate user entry of payment, billing, or account information needed to purchase the components, as mentioned above.

In some embodiments, the method (e.g., the server) may automatically determine the sources for candidate components by accessing an internal or external database, and/or by searching a network, e.g., the Internet, where, as noted above, specified selection or priority criteria may be used to guide the search. The user may be prompted to approve or initiate a suggested order or purchase, or to select from candidate components, after which the order may be placed, and the component delivered for inclusion in the actual system. For example, in one embodiment, if the component is a software program or configuration data, the server (or another external server system) may download the component directly to the client computer system, from which the component may be deployed to the actual system. As another example, if the actual system (which may include the client computer system) is networked to the server, the server may automatically download and deploy the component to or on the actual system. In another embodiment, the server (or another system) may download the component to the client computer system, and the client computer system may automatically deploy the component to the actual system, e.g., possibly using installation software downloaded with the component. Thus, the system may be operable to determine missing components, order and purchase the components, and deploy the components to the actual system, e.g., in order to bring the actual system into compliance with the configuration diagram.

It should be noted that in some embodiments, the search may not be performed solely on the basis of each required individual component. For example, a subset of a system may be represented by a graph structure, and successive, expanding, subsets of the system may be queried for in the database(s). This user may thus be able to purchase a sub-system based on the ability of a vendor to have available a connected subset of a system. Similarly, pricing and other information (e.g., a quote) may be provided for specified subsets of the system.

The user may purchase the different components from different vendors. As noted above, some of the components may be available for free or download via a network connection. For example, the user may require driver software and may be able to freely download it and update his actual system. In some cases, the user may have on hand some of the newly identified missing components, and so may mark these components for exclusion in the search operation to obtain a quotation.

In one embodiment, if the search is unable to find an exact match, a vendor (e.g., software operating on a vendor server and/or a human operator, may determine that a modified version of the desired component or subsystem may be created for the user, and may present this modified solution for consideration by the user. The vendor may set thresholds for matching in order to be notified when such requests are made. The vendor may be able to manually respond to the request by the user in this case where a database query alone may not have resulted in provision of a valid quotation to the user.

If the component includes hardware, the component may be delivered via any physical means, e.g., mail, special delivery, etc., after which the user (or someone else) may deploy the component to the actual system. Thus, one or more of the missing components may be acquired, e.g., via download from the server (or a different server), e.g., for software, data, etc., and/or via more physical means, such as delivery via any of various delivery or postal means, e.g., for hardware and/or software/data, etc.

BRIEF DESCRIPTION OF THE DRAWINGS

A better understanding of the present invention can be obtained when the following detailed description of the preferred embodiment is considered in conjunction with the following drawings, in which.

Figure 1A:
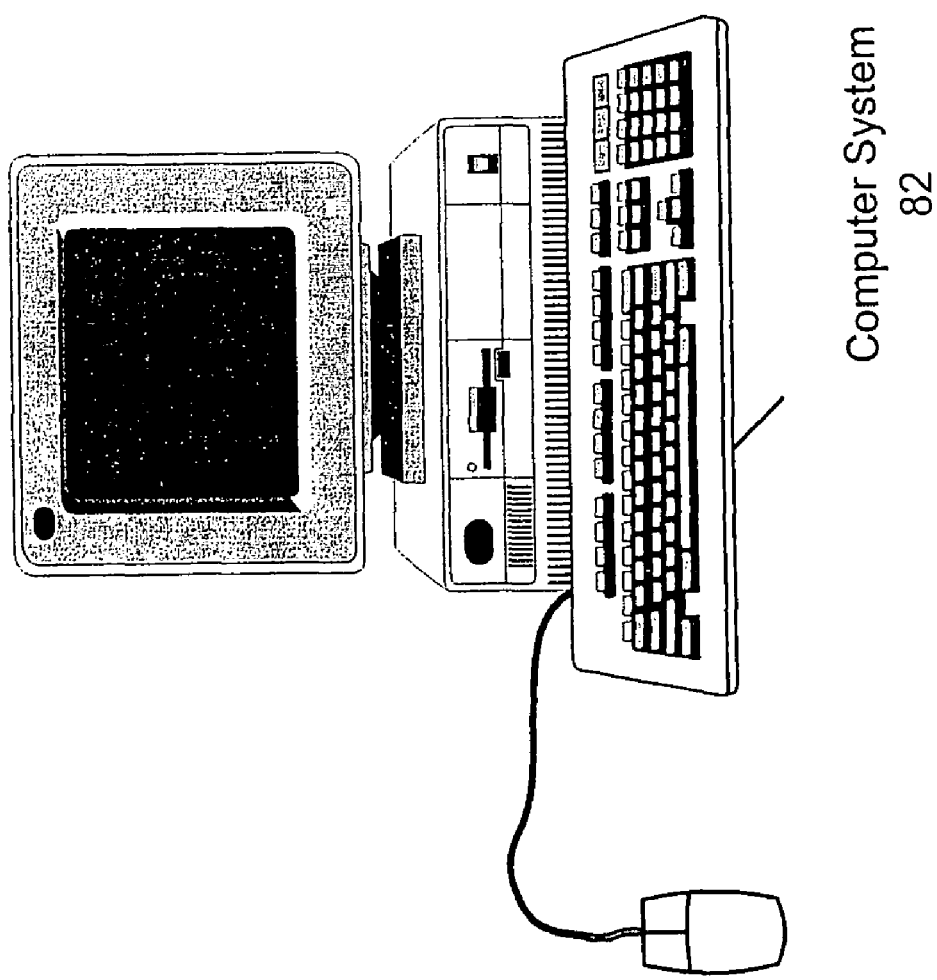
FIG. 1A illustrates a computer system operable to implement various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. patent application Ser. No. 08/870,262 titled "Method for Detecting Differences Between Graphical Programs," filed on Jun. 6, 1999.

U.S. patent application Ser. No. 09/339,340 titled "System, Method and Memory Medium for Detecting Differences Between Graphical Programs," filed on Oct. 24, 2000.

U.S. patent application Ser. No. 10/113,987 titled "A Configuration Diagram Which Displays a Configuration of a System," filed on Apr. 1, 2002.

U.S. patent application Ser. No. 10/338,512 titled "Network-Based System for Analyzing a Client System and Generating a Configuration Diagram which Describes the Client System," filed on Jan. 8, 2003.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment", filed Sep. 22, 1993.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 5,990,906 titled "Undo Feature for a Graphical Programming System," filed Aug. 19, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 10/338,533 titled "Network-Based System which Provides a Database of Measurement Solutions", filed Jan. 8, 2003.

U.S. Patent Application Publication 20030036874 (Ser. No. 10/101,512) titled "Network-based System for Configuring a Measurement System using Configuration Information Generated based on a User Specification", filed Mar. 19, 2002.

U.S. Patent Application Publication 20030036876 (Ser. No. 10/120,257) titled "Network-based System for Configuring a Measurement System using Configuration Information Generated based on a User Specification", filed Apr. 10, 2002.

U.S. patent application Ser. No. 10/101,508 titled "Network-based System for Configuring a Measurement System using Software Programs Generated based on a User Specification", filed Mar. 19, 2002.

U.S. patent application Ser. No. 10/101,507 titled "Network-based System for Configuring a Programmable Hardware Element in a Measurement System using Hardware Configuration Programs Generated Based on a User Specification", filed Mar. 19, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Configuration Diagram—a graphical representation of a system, including a plurality of icons or nodes that represent hardware and/or software components or resources of the system, optionally interconnected, corresponding to connections and/or associations between the components or resources, i.e., physical and/or data coupling between the components or resources.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments Corporation, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute software programs for determining and/or merging differences between configuration diagrams. Various embodiments of methods for determining and merging differences between configuration diagrams are described below.

As shown in FIG. 1A, the computer system 82 may include a display device operable to display configuration diagrams, and optionally, graphical programs. The display device may also be operable to display a graphical user interface for user interaction with software and/or hardware implementing embodiments of the present invention. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., graphical programs, which are executable to perform the methods described herein. Also, the memory medium may store a programming development environment application used to create and/or execute such programs, e.g., the LabVIEW graphical programming development environment provided by National Instruments Corporation. The memory medium may also store operating system software, as well as other software for operation of the computer system. Various embodiments further include receiving or storing instructions and/or data implemented in accordance with the foregoing description upon a carrier medium.

Figure 1B:
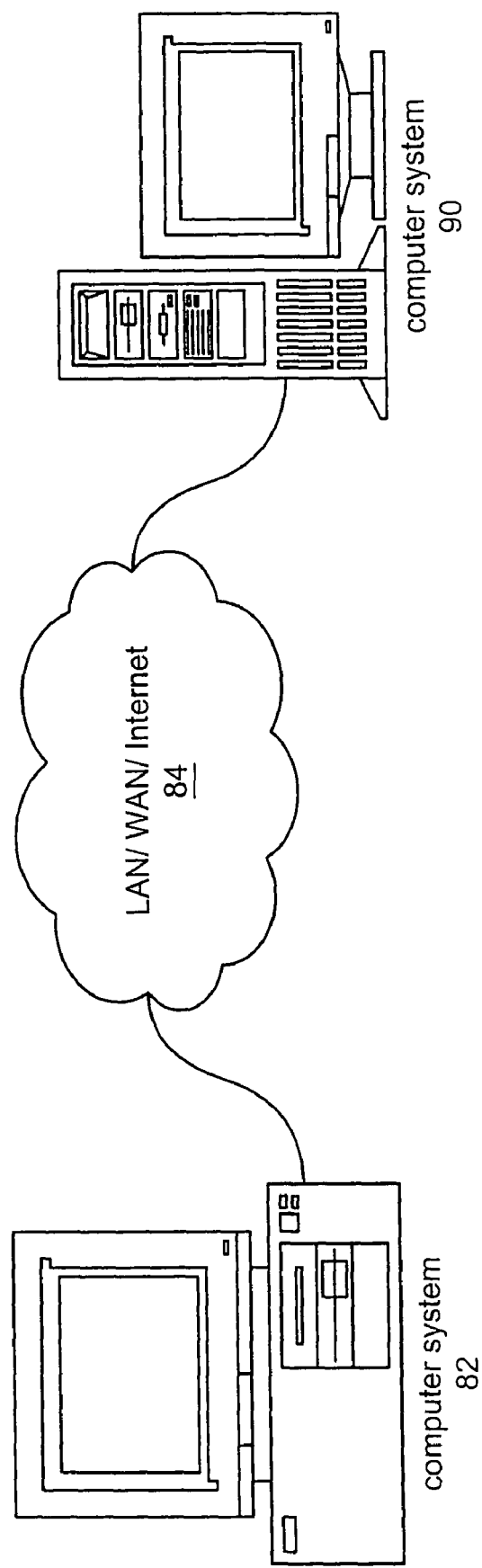
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others.

In some embodiments, the computer systems 82 and 90 may implement and/or execute software programs in a cooperative or distributed manner. For example, in embodiments that utilize graphical programming methodologies, the computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

As will be described in more detail below, in some embodiments, the computer system 82 may be coupled to additional devices, e.g., comprised in the computer system 82, comprised in the second computer system 90, and/or coupled to one or both of the computer systems 82 and 90 via the network 84. Software executing on the computer system 82 may be operable to receive configuration diagrams from, or generate configuration diagrams based on, the devices (including computer system 90) on the network 84.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, e-commerce, games, etc.

Figure 2A:
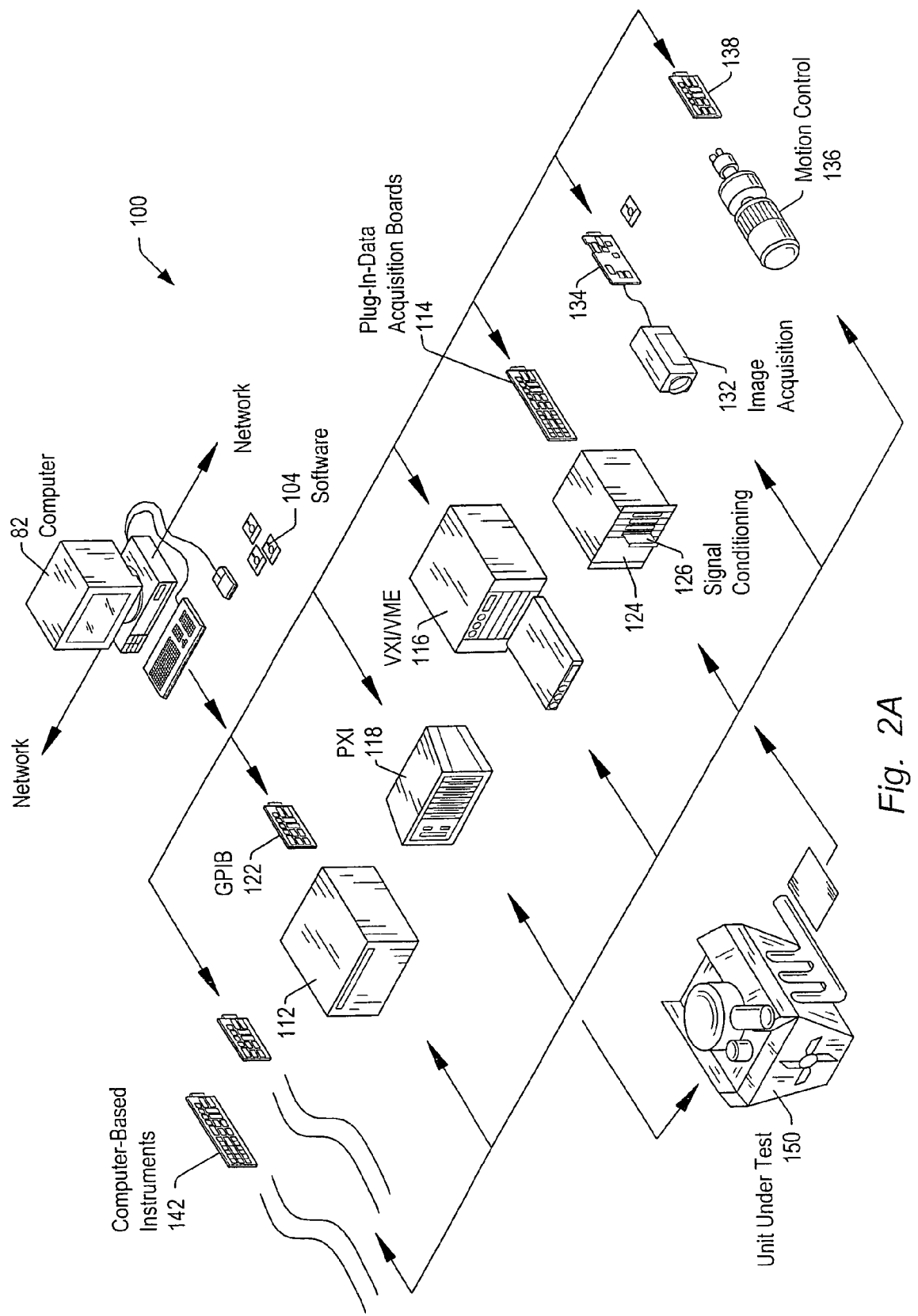
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
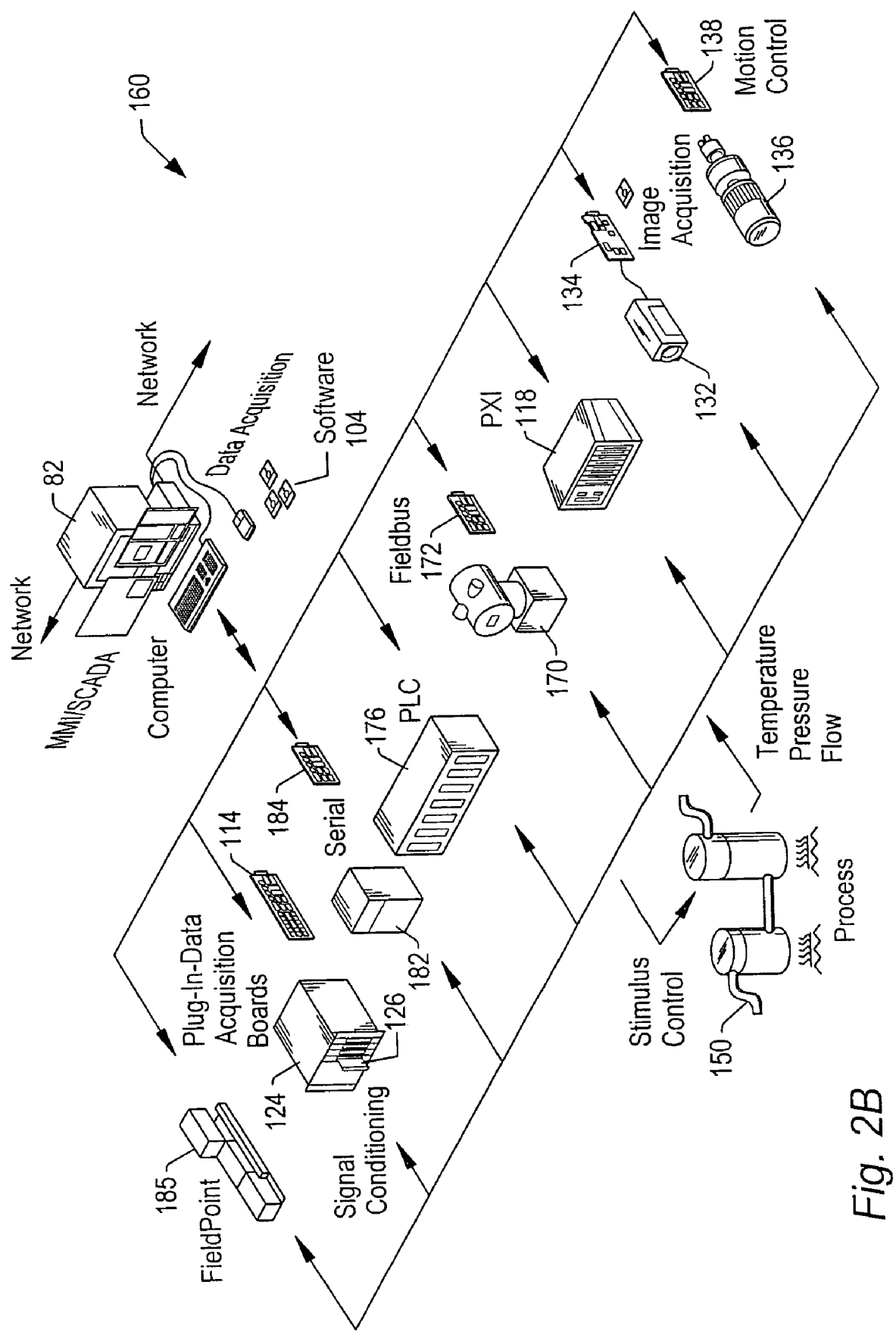
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments Corporation, among other types of devices.

In the embodiments of FIGS. 2A and 2B, described above, one or more of the various devices may couple to each other over a network, such as the Internet. In some embodiments, one or more programs according to the present invention may be operable to generate and/or analyze configuration diagrams representing these types of systems. For example, software executing on computer system 82 may determine hardware devices on the network, as well as configuration information for each device, including, for example, applications, driver software, hardware configuration programs, configuration parameters, and/or other resources used by or in conjunction with the devices, and generate one or more configuration diagrams representing the system, including, for example, connectivity among the system components.

As noted above, in some embodiments, at least a portion of the software may be implemented in a graphical programming language, such as the "G" graphical programming language provided by National Instruments Corporation.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
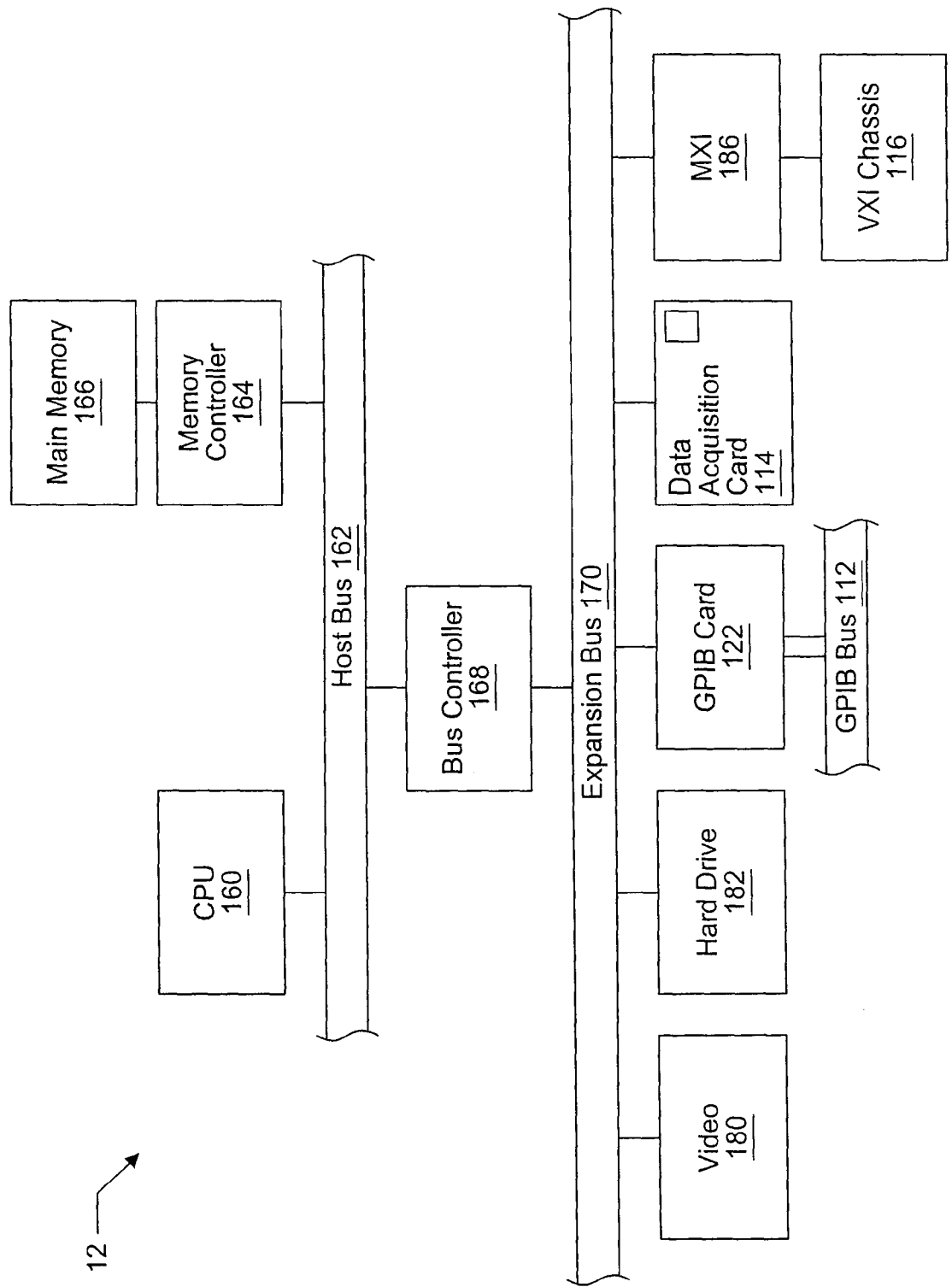
FIG. 3 is an exemplary block diagram of the computer systems of FIGS. 1A, 1B, 2A and 2B.

FIG. 3—Computer System Block Diagram

FIG. 3 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store configuration diagrams, as well as software according to embodiments of the present invention for analyzing the configuration diagrams. In some embodiments, programs for generating configuration diagrams may also be stored. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. As noted above, in some embodiments, the program may be a graphical program. For example, the deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

FIGS. 4A-4G—Example Configuration Diagrams

A configuration diagram may comprise a plurality of nodes representing components or resources in the represented system, and optionally, interconnections representing physical and/or data coupling between the components or resources, and thus may provide a graphical representation of a system, including hardware and/or software components of the system. Note that as used herein, the terms "software" and "software components" may refer to any type of software or data resource, including, for example, programs, graphical program nodes, drivers, configuration data for hardware or software, databases, protocols, version information, and so forth. FIGS. 4A-4G illustrate example configuration diagrams for a variety of systems, including software and/or hardware systems. It should be noted, however, that the configuration diagrams shown are intended to be exemplary only, and are not intended to limit the configuration diagrams used in or by embodiments of the present invention to any particular form, function, or appearance.

In some embodiments, a configuration diagram may be operable to present different views, such as an entire system view, a subsystem view, an individual device view, a program relationship view, etc., which in some embodiments may each be treated as individual configuration diagrams. In other words, a configuration diagram may include a "device view" that only shows device icons (i.e., nodes), and optionally interconnections between the cons. The configuration diagram may also include a "program view" that shows program icons, optionally including interconnections indicating data flow, dependencies, calling relationships, etc. The program view may show only program icons, or may show the program icons proximate the respective device icons on which they are stored. Alternatively, each of these "views" may instead be a separate configuration diagram, where the represented system is actually a subsystem of a larger system.

In cases where a program is configured as a hierarchy of a main program and one or more sub-programs, the system may display a hierarchy view comprising an icon representing the main program and an icon representing each of the one or more sub-programs. The relationship view or diagram may also display connections or links between the program icons. In the hierarchy view, the program icons are arranged and are preferably connected to visually indicate the hierarchy. In the case of a plurality of software objects configured to invoke methods and trigger events on each other, the system may display an object-oriented view comprising an icon representing each of the programs, and possibly connections indicating the method invocation and/or event messaging. In the case of a graphical program which is configured as a hierarchy of a main graphical program and one or more sub-graphical programs (e.g., a main VI and one or more sub-VIs), the system may display a hierarchy view comprising an icon representing each of the main graphical program, an icon representing each of the one or more sub-graphical programs, and connections between the program icons to visually indicate the hierarchy. Examples of hierarchy views of graphical programs are shown in FIGS. 4A-4E, and 4G, described below. This allows the viewer to easily view the programs present in the system which may be used in configuring the distributed system. In another embodiment, the program icons resident in a device may simply be displayed, without any type of relationship view.

As discussed above, one or more existing or created programs may be displayed in a relationship view in the configuration diagram. The program icons may be displayed proximate to (e.g., under) and/or connected to the device icon on which they are stored or located (deployed). For example, programs that are stored on the main computer system 82 may be displayed proximate to the main computer system device icon. Alternatively, as mentioned above, the configuration diagram may support a program relationship view that displays only program icons, without device icons. Links may be displayed between the program icons to indicate invocation (caller/callee) relationships.

Thus the configuration diagrams may represent hardware and/or software systems, and their interdependencies or associations, e.g., deployment relationships, caller/callee relationships, device connectivity, attributes, configurations, etc.

Figure 4A:
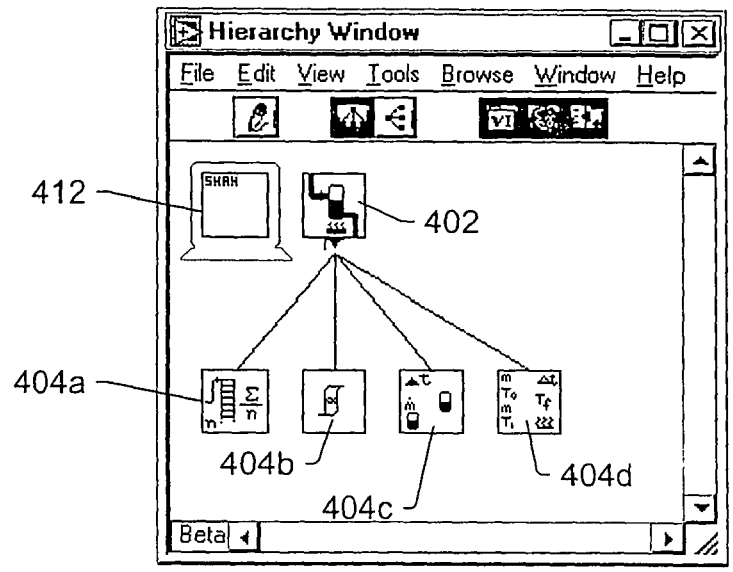
FIGS. 4A-4I illustrate example configuration diagrams, according to various embodiments.

For example, FIG. 4A illustrates one embodiment of an exemplary configuration diagram that includes a hierarchy of program icons 402 and 404A-D and a device icon 412. As FIG. 4A shows, the hierarchy of program icons includes a main program icon 402 at the top level of the program hierarchy and four program icons ("sub-program icons) 404A-D at the next level of the program hierarchy.

Figure 4B:
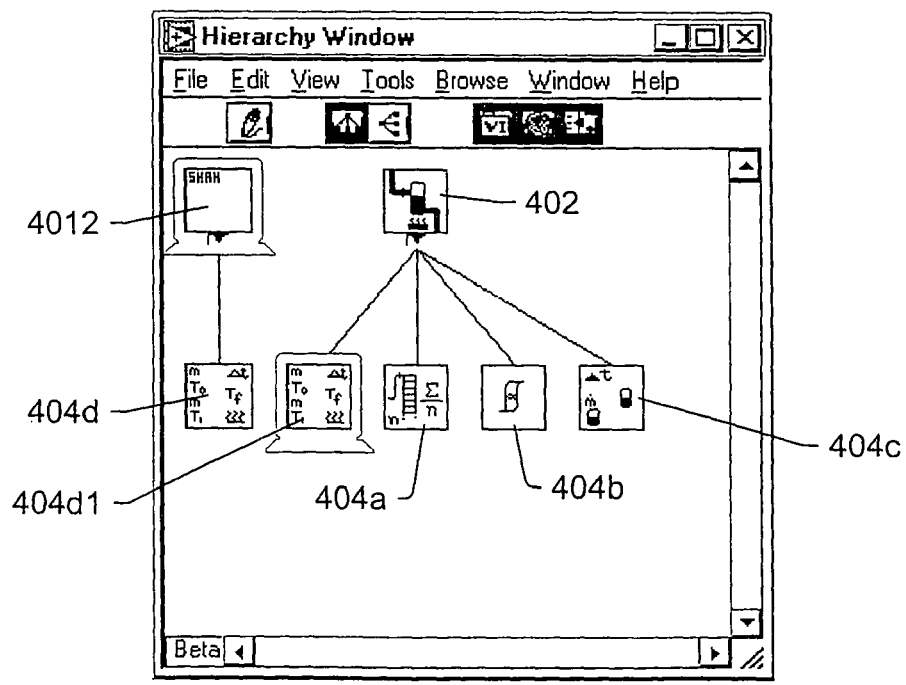

In one embodiment, parts of an application may be distributed among different devices in the distributed system for distributed execution, which may affect the operation of the programs contained on the original or source device (e.g., the main computer system) that are being executed. For example, a sub-program of a main program may be deployed onto a different device for execution. One embodiment of a configuration diagram for such a system configuration is illustrated in FIG. 4B, wherein the top level program in the program hierarchy has three sub-program icons 404A-404C which are resident on the main machine 82, and an icon 404D1 corresponding to the remote device in the hierarchy indicating that a call is being made to a remote device during execution.

Figure 4C:
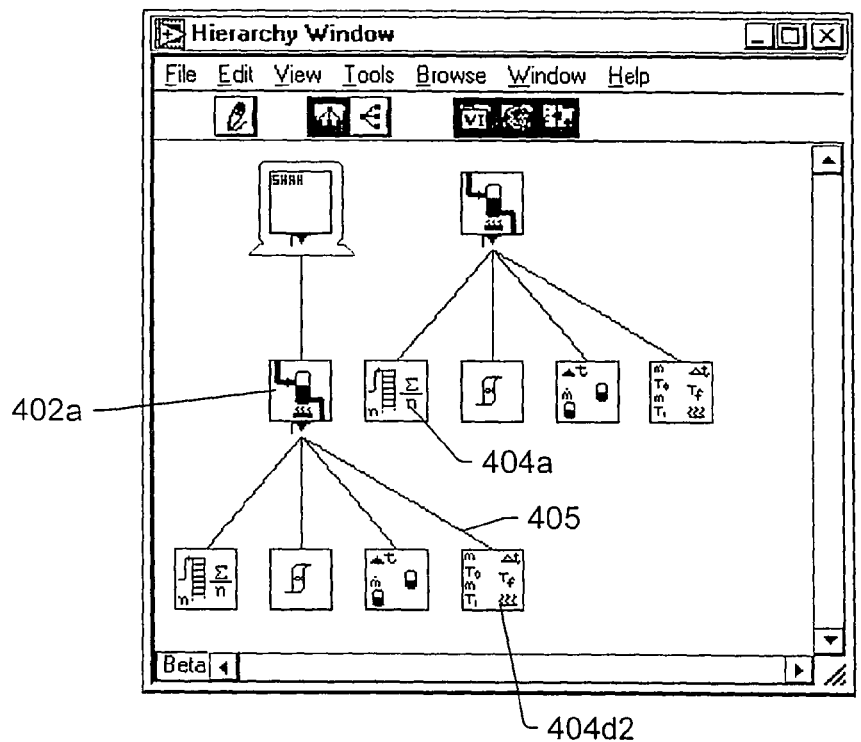

FIG. 4C illustrates a similar configuration diagram as that of FIG. 4A, but where the program icon 402 has been associated with the device icon 412 (e.g., by a user dragging and dropping the program icon 402 on to the device icon 412). As shown in FIG. 4C, the program icon 402, as well as the lower level program icons 404A-D are displayed proximate to (e.g., under) the device icon labeled "Shah" 412, visually indicating that the entire program hierarchy has been deployed on the device represented by the device icon 412.

Figure 4D:
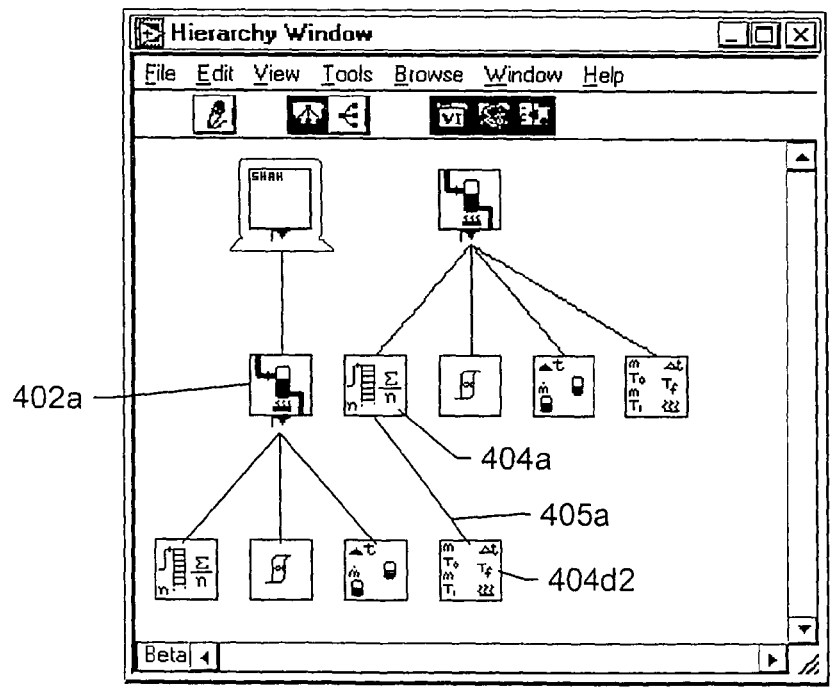

Note that the configuration diagram illustrated in FIG. 4C shows the invocation relationship or caller/callee relationship between the programs. If the program represented by program icon program 402a does not invoke or call the program represented by program icon 404d2, the link icon 405 may be drawn between program icon 404a and program icon 404d2, in which case the configuration diagram may appear as shown in FIG. 4D, where program icon 404a is connected by link icon 405a to program icon 404d2, and link icon 405 between program icons 402a and 404d2 is not displayed, indicating that the program represented by program icon 404a is configured to call the program represented by program icon 404d2, rather than the program represented by program icon 402a being configured to call the program represented by program icon 404d2, as represented by FIG. 4B.

Figure 4E:
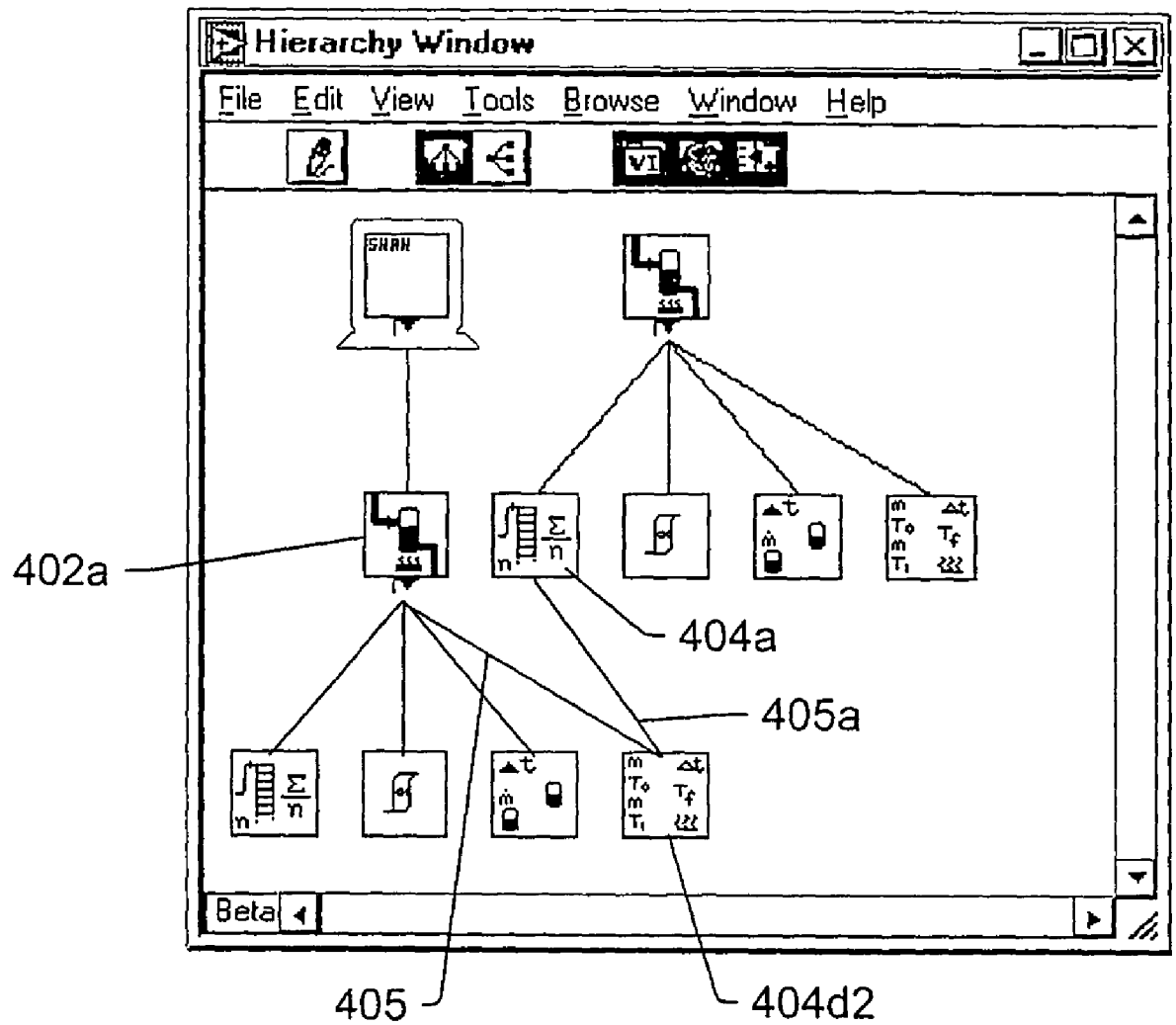

If both programs represented by program icons 402a and 404a are configured to call program 404d2, a link between program icon 404a and program icon 404d2 may be displayed, as shown in FIG. 4E, where links are displayed between program icons 402a and 404d2 as well as between program icons 404a and 404d2.

As noted above, the configuration diagram may include device icons that represent the various devices in a distributed system. Each of the device icons preferably has an appearance which corresponds to the device it represents. Thus, a computer system 82 may be represented by a device icon that has the appearance of a computer system. In a similar manner, other device icons may have an appearance which is similar to the appearance of the device it represents. This allows the viewer to easily view and understand what devices are present in the distributed system.

Figure 4F:
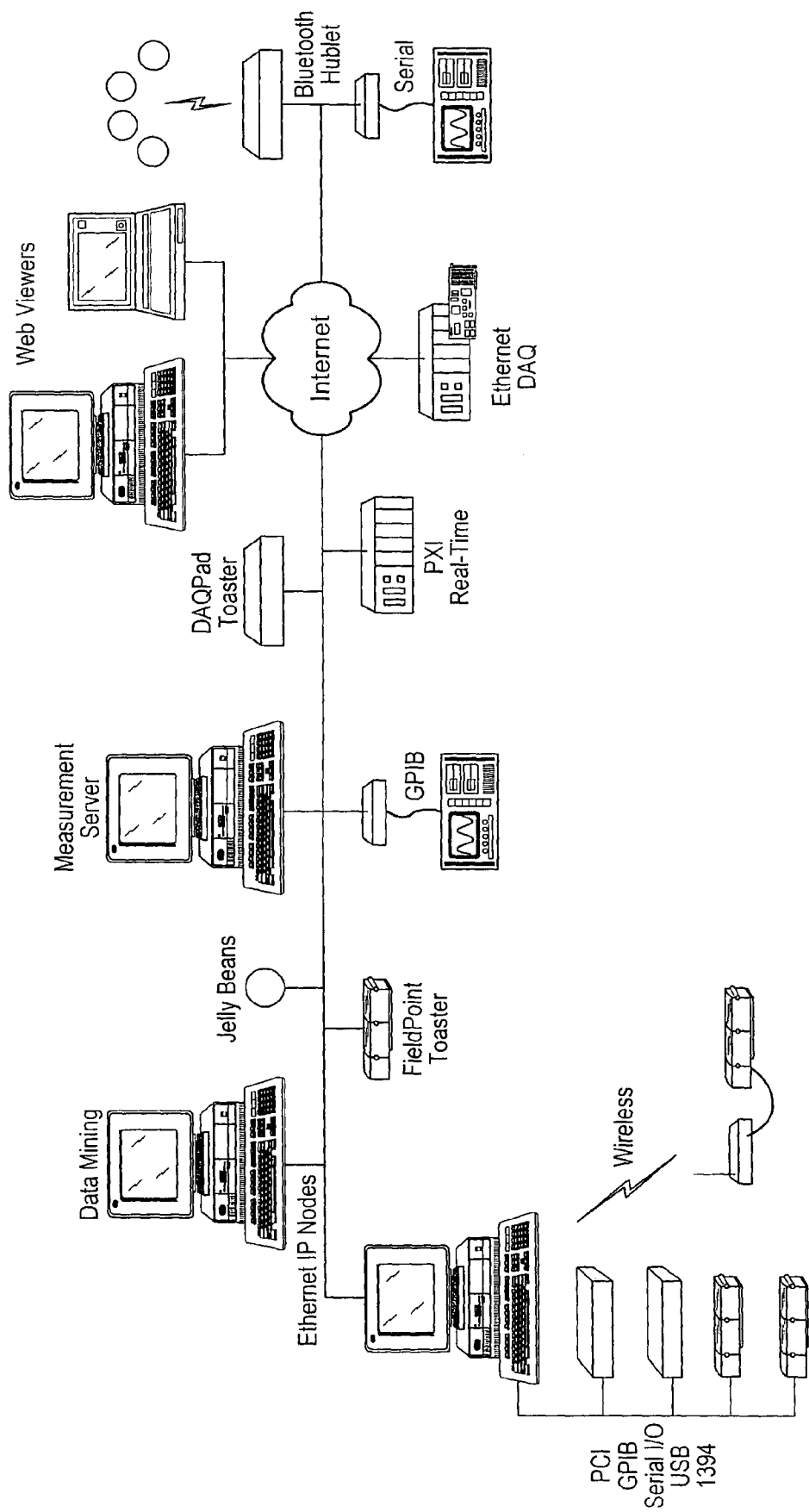

FIG. 4F illustrates one embodiment of a configuration diagram representing a distributed hardware system. As may be seen, this particular example system includes a plurality of devices coupled via a variety of communication buses, including Ethernet (Internet), GPIB, Wireless (e.g., Ethernet, Bluetooth), PCI, Serial I/O, USB, and 1394, as illustrative examples of inter-device connectivity means, although any other buses and protocols may be used as desired.

Figure 4G:
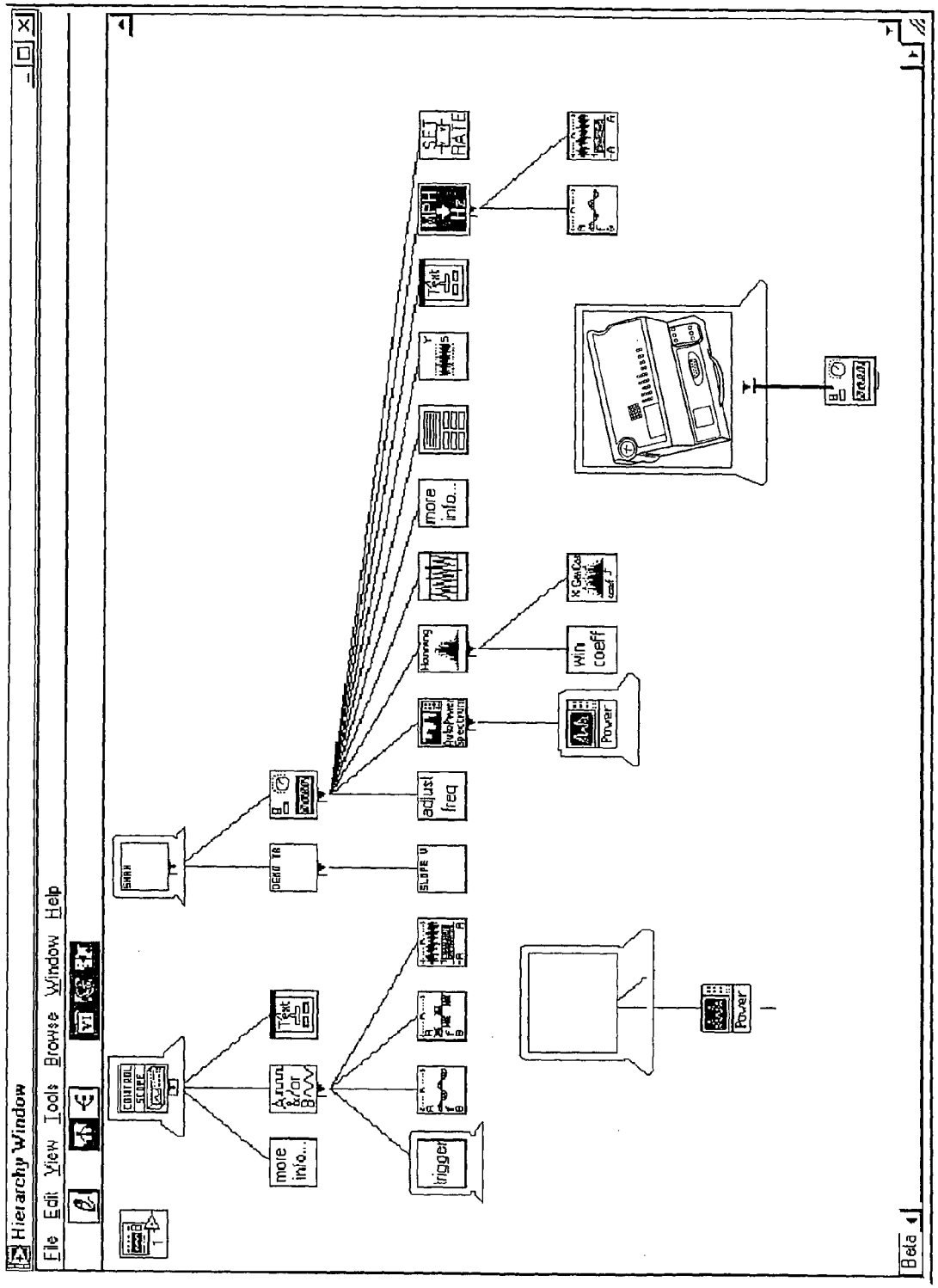

FIG. 4G illustrates one embodiment of a more complex configuration diagram representing a distributed hardware/software system. As FIG. 4G shows, in some embodiments, the configuration diagrams may include a broad diversity of hardware and software, and as mentioned above, may illustrate the hierarchical organization of the hardware and/or software of the represented systems.

In some embodiments, a configuration diagram may be operable to receive user input invoking display of and/or modifying configuration data for components in the diagram.

Figure 4H:
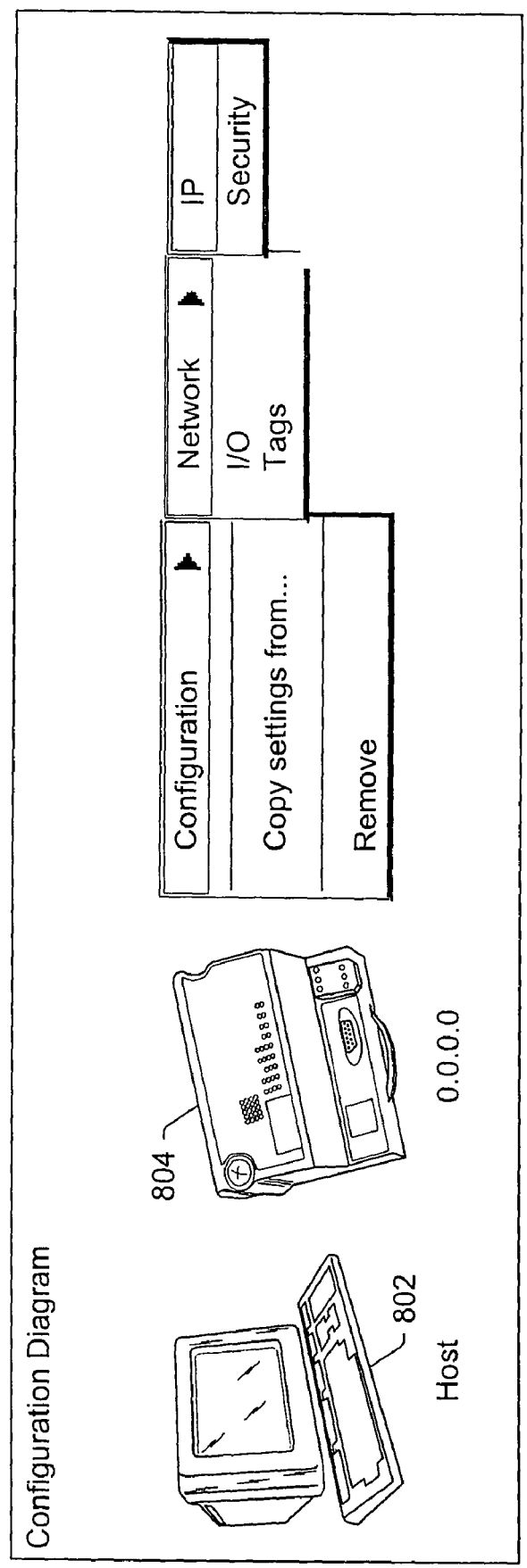

FIG. 4H illustrates an exemplary configuration diagram that includes a device icon 802 which represents a host computer, and a device icon 804 which represents a measurement or control device. In this example, the device icon 804 represents a Fieldpoint device from National Instruments, which may be used for measurement or control applications. As shown, the user can select the device icon 804 representing the Fieldpoint device, upon which one or more menus may be displayed. The user can select various options from these menus.

As shown, the user can select a configuration option on a first menu. This selection produces a second menu that has items for network, I/O, and data points, e.g., tags. As used herein, the term "data point" includes a data point, I/O point, data tag, I/O channel data values, and other types of data values. The data point may be associated with or generated by a device, or may be calculated by a program. When the user selects the network option, the user may receive further options for configuring the IP address of the device, or a security aspect of the device.

Thus, as FIG. 4H shows, in this embodiment, the user may select a "Configuration" menu item, which may then invoke specific configuration menu items for viewing and/or modifying configuration data, including "Network" configuration data, e.g., "IP" and "Security" data, as well as "I/O" and "Tags" configuration data. In the embodiment shown, the user may select a menu item, thereby invoking display of corresponding configuration data. In some embodiments, the user may also provide further input setting or modifying the configuration data. As also shown, menu options are provided for manipulating or otherwise interacting with the configuration diagram, including a "Copy settings from . . ." item whereby configuration data may be copied from a specified component, and a "Remove" option, whereby a component or group of components may be removed from the configuration diagram.

Figure 4I:
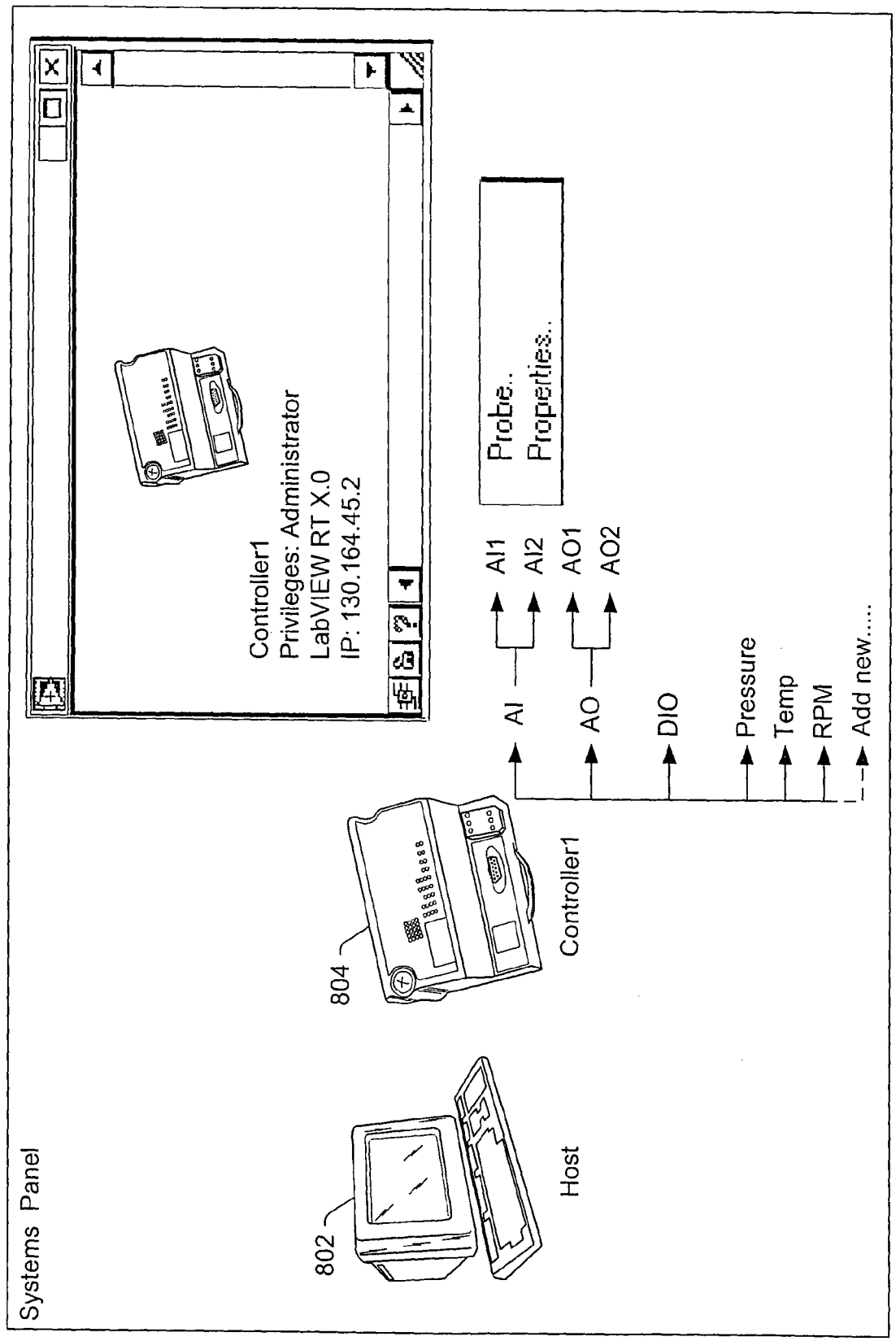

Although not shown in FIG. 4H, when the user selects the I/O selection, in one embodiment a measurement configuration program, such as Measurement and Automation Explorer from National Instruments, may be initiated to configure I/O channels. If I/O channels already exist or have previously been configured, then these items may be displayed, as shown in FIG. 4I, and described below. Thus, when the user selects the I/O or tags items in FIG. 4H, if physical I/O points had previously been configured, or data points or tags had previously been configured, then information regarding these may be displayed, as illustrated in FIG. 4I.

FIG. 4I illustrates yet another example configuration diagram that facilitates display and/or modification of configuration data for components represented in the diagram. As FIG. 4I shows, in this embodiment, the system includes host computer system 802 and controller 804. The diagram is operable to display various properties of the controller, including for example, the disposition and configuration of the controller I/O channels or terminals, and may optionally allow user-modification of the configuration data. Note that in this embodiment, access to configuration data, e.g., viewing and/or modifying, may be managed via user privilege levels, as illustrated by the "Administrator" access level indicated in FIG. 4I. As shown in FIG. 4I, if the user selects the I/O menu item (e.g., as shown in FIG. 4H, described above), various configured I/O channels may be illustrated, such as analog input, analog output, or digital I/O. As also shown in FIG. 4I, if the user selects the tags or data points item, various configured data points may be shown, such as, e.g., pressure, temperature, RPM etc. Thus, as shown in FIG. 4I, the system may display configured I/O or configured data points. These items may be displayed in a "tree view", or other suitable view. The system may also display an "add new" feature which allows the user to add new physical I/O or data points directly to the tree structure shown in FIG. 4I.

As also shown in FIG. 4I, the user can select a data point item and select various options. For example, the user can select an analog input item (e.g., AI1), which causes a menu to be displayed, from which the user can probe the I/O point (data point) or configure properties of the I/O point. Another feature of the "tree view" shown in FIG. 4I is that every individual tree is preferably collapsible. Thus, the user can choose to see only programs, only data points, only I/O channels, or an entire hierarchical view.

Thus, in various embodiments, a configuration diagram may facilitate user interaction to invoke display and/or modification of the configuration diagram, including configuration data for one or more of the components included or represented in the configuration diagram. This configuration data may be analyzed as described below with reference to FIGS. 5 and 6, to determine differences between, and/or to merge, configuration diagrams.

In some embodiments, a program stored on a device may optionally be represented by a device icon. This may be desirable where a certain program performs a "device-like" function. In another embodiment, a non-present device may have a device icon (virtual device icon), and the functionality of the non-present device may be simulated by a program executing on the main computer system or another device.

As described above, the configuration diagram may include connections ("connection icons") such as lines, that are displayed between the various device icons to show the interrelationship or coupling between the respective devices. In one embodiment, the connections that are displayed may be context sensitive to indicate the type of interconnection or interface (e.g., bus type), and/or the type of data or phenomena being provided between the devices.

In a measurement application, the device icons may represent the various measurement devices present in the system, such as those shown in FIGS. 2A, 2B and 3. For example, there may be device icons present for any one or more of the various measurement or automation devices shown in FIGS. 2A, 2B and 3. Thus, as one example, where a computer system is coupled to a PXI chassis that includes a plurality of PXI instrument cards comprised in the chassis, the configuration diagram may include a device icon which represents the computer system, and a device icon which represents each of the respective PXI instruments comprised in the PXI chassis. The configuration diagram may also optionally include a device icon which represents the PXI chassis, with further device icons comprised in or proximate to the PXI chassis device icon representing each of the respective PXI instrument cards. As another example, where one or more smart sensors are present in the measurement system, device icons may be present which represent each of the various smart sensors. In a machine vision application, device icons may be present for a host computer system 82, an image acquisition board 134, and a camera 132, which may be a smart camera as desired. Thus, the configuration diagram graphically displays a plurality of device icons which represent the devices that are present in the system, and/or a plurality of software and/or data icons which represent the software and/or data present in the system. As noted above, "software" may refer to any type of software or data resource, including, for example, programs, graphical program nodes, drivers, configuration data for hardware or software, databases, protocols, version information, and so forth.

Figure 5:
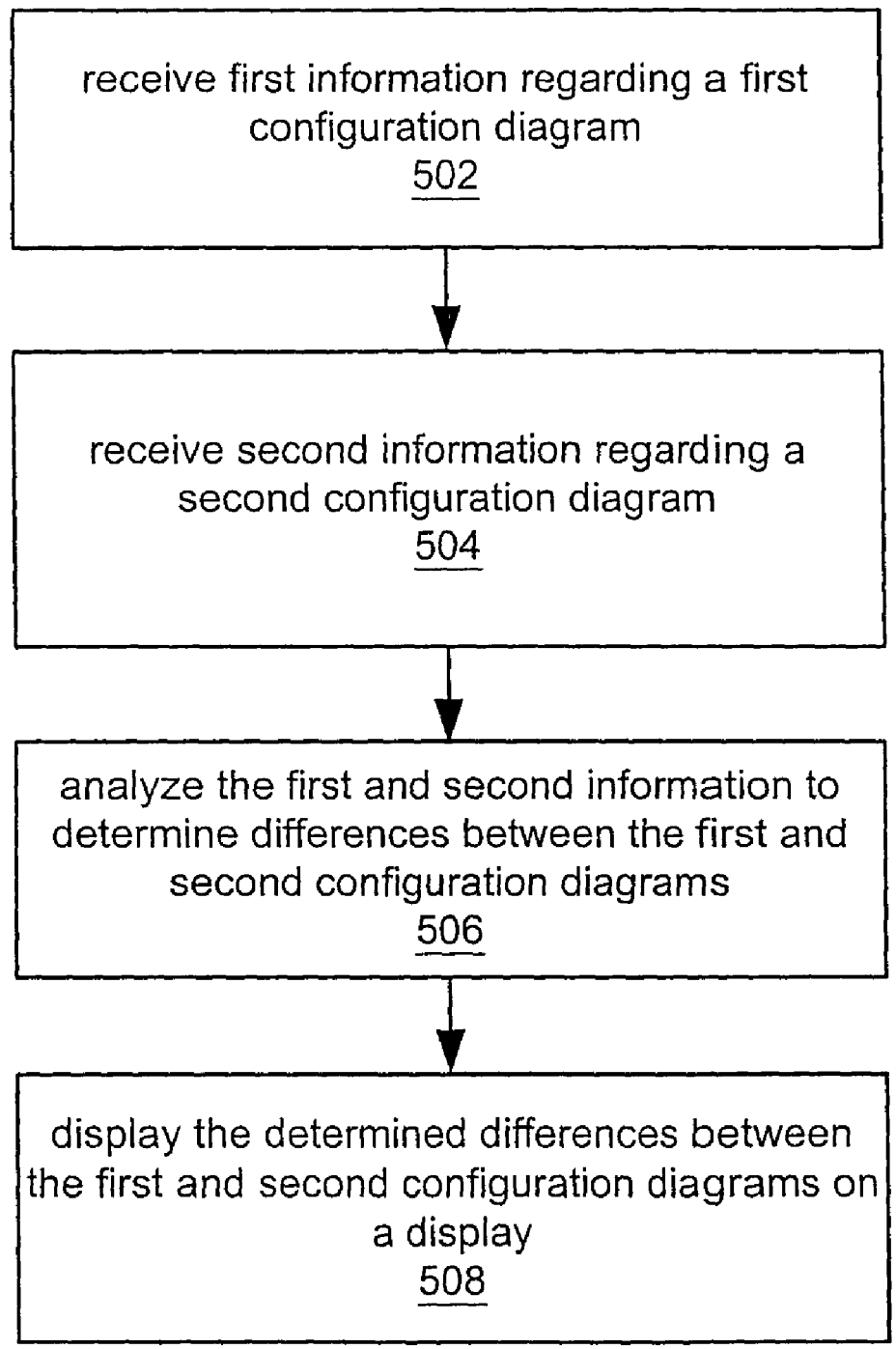
FIG. 5 is a flowchart diagram illustrating one embodiment of a method for displaying differences between configuration diagrams.

FIG. 5—Method for Determining Differences Between Configuration Diagrams

FIG. 5 illustrates a computer-implemented method for determining and displaying differences between configuration diagrams, according to one embodiment. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, information regarding a first configuration diagram may be received, where the first configuration diagram represents a first system. As indicated in 504, information regarding a second configuration diagram may also be received, where the second configuration diagram represents a second system. As described above, a configuration diagram may comprise a plurality of nodes representing components in the represented system, and optionally interconnections representing physical, logical, and/or data coupling between the components or resources. Note that the first and second systems may be of any type. For example, the first system and the second system may each comprise one or more of: an industrial automation system, a process control system, and a test and measurement system, among others. In a preferred embodiment, at least one of the systems comprises a measurement system.

It should be noted that each of the configuration diagrams may represent an actual system, or a "virtual" system. For example, the first system may be a desired system or a system specification, e.g., a virtual system, i.e., not an actual physical system, and the second configuration diagram may represent an actual system, e.g., owned or operated by the user. Note that this distinction may apply to any type of system, including, hardware, software, including hardware configuration programs for programmable hardware elements, and/or configuration data, among other types of systems. In some embodiments, each of the configuration diagrams may represent an actual system, where, for example, the user may wish to know how their system (e.g., represented by the second configuration diagram) compares or differs from some other system, e.g., an actual "reference" system (e.g., represented by the first configuration diagram). Alternatively, each of the configuration diagrams may represent virtual systems, i.e., systems that are not actualized or implemented, e.g., which may be useful in system design and planning, among other uses.

In various embodiments, the information regarding the first and second configuration diagrams may be any type of information related to or characterizing the configuration diagrams and/or the represented systems. For example, in some embodiments the information may include one or both of the configuration diagrams themselves. In other embodiments, the information regarding a configuration diagram may include one or more of: an abstract representation of the configuration diagram, e.g., a data structure or description specifying the plurality of nodes, and optionally, interconnections, component or resource attributes, e.g., identification, sub-components, configuration data, version information, descriptions, deployment (i.e., the location and/or execution target of a component), and so forth. Thus, the information regarding each configuration diagram may include one or more of: the configuration diagram, a graph of the configuration diagram, a description of the configuration diagram, and a data structure specifying the configuration diagram.

Thus, the information for each configuration diagram may include information related to the corresponding system's components or resources, and may also include information related to the connectivity or associations between the system components or resources.

Henceforth, in this document the components or resources comprised in or represented in the configuration diagrams may be referred to by the term "component", although it should be noted that as used herein, component may mean any or all of a hardware component or group of components, a device or group of devices, a software component, program, or group of programs, data (e.g., configuration data), or any other aspect of a system or system element.

Note that the information for the configuration diagrams may be received in any of a variety of ways. For example, in one embodiment that includes a client system and a server system, the user may provide the first and/or second information to the server, e.g., via a GUI provided by the client system and/or the server. In some embodiments, the method may include querying an actual system to determine the information, e.g., the first and/or second information. For example, in the embodiment described above, where the first configuration diagram comprises a system specification for a virtual system and the second configuration diagram represents the user's possibly incomplete system, i.e., the second system, the second system may be queried to determine the second information. For example, in one embodiment, software executing on the host (i.e., client) computer system, or a server computer system, may establish an association with the second system, e.g., over a network, after which the second system may be queried for the second information regarding the second system. For example, an IP (Internet Protocol) address or URL (Universal Resource Locator), or other network address, may be provided, e.g., by the user, which may then be used to establish the association. The method may include prompting the user for the address, e.g., via a GUI.

Thus, the second information regarding the second system may be received in response to the querying. For example, if the second system is coupled to the host computer (or the server computer) over a network, a discovery process may be performed, either automatically or via invocation by the user, in which the second system, and possibly each component of the second system, is queried to determine the second information. In one embodiment, "Plug and Play"-type information stored on the client computer system (or another computer system) may be queried to determine the second information. In another embodiment, an internal or external database or equivalent that stores a description of the second system may be queried to determine the second information. Note that as used herein the term "database" may include a distributed database that comprises a plurality of databases distributed over a network. In further embodiments, the second system may be queried for a first portion of the second information, e.g., component identification (ID) information, connectivity, etc., and the database or equivalent may then be queried to determine a second portion of the second information. For example, the ID information may be used to direct queries to the database.

In another embodiment, the user may provide information describing or specifying a task or system functionality, e.g., via a GUI displayed on the client system and provided by the client system and/or the server computer system, e.g., via a GUI displayed on a vendor's website. The method may then include automatically or programmatically determining a system suitable for performing the specified task, i.e., determining the first information. For example, based on the information describing or specifying the task or desired functionality, the server (or client) may query a database of configuration diagrams to determine or select a configuration diagram corresponding to the appropriate system. Note that any of the techniques disclosed herein may be used for either or both of the first and second configuration diagrams (and/or systems).

In 506, the first and second information received in 502 and 504 above may be analyzed to determine differences between the first and second configuration diagrams. In a preferred embodiment, the determined differences correspond to or reflect differences between the systems respectively represented by the first and second configuration diagrams. In various embodiments, the analysis of 506 may be performed automatically, e.g., as part of a "Plug and Play" process, or, may be performed in response to user input.

The determination of the differences between the first and second configuration diagrams may be performed in a variety of different manners. In some embodiments, the analyzing may include creating one or more data structures which include information regarding the first plurality of nodes in the first configuration diagram and the second plurality of nodes in the second configuration diagram, where determining differences includes comparing the one or more data structures to determine the differences. For example, in one embodiment, the one or more data structures may each comprise directed graphs including a plurality of vertices connected by edges, where each of the vertices represents one of the nodes in a respective one of the first and second configuration diagrams. The directed graphs may then be analyzed to determine the differences. For example, in one embodiment, the configuration diagrams, or representations thereof, may be traversed or "walked", to enumerate their respective components and connections. For example, if the configuration diagrams are represented by respective graphs, each graph may be traversed, where each node and connection (if any) is recorded. The resulting lists may then be compared to determine the differences.

In some embodiments, the information received in 502 and 504 above may comprise lists of components or resources, optionally including connections between the components or resources. The analysis may then include comparing the lists to determine the differences. Of course, depending upon the type and form of the received information, any other type of comparison may be made as appropriate to determine the differences.

It should be noted that in some embodiments, determining the differences between the configuration diagrams may also include determining differences between components in the corresponding systems. For example, in some embodiments, differences between hardware devices (if any) comprised in the first and second systems may include differences in one or more of: number and types of the hardware devices, sub-components of the hardware devices, and configuration of the hardware devices. For example, consider the case where the same type of hardware device is represented in both diagrams, but where one or more aspects of the hardware devices differ in the two systems, e.g., software (e.g., software programs and/or versions), configuration data, expansion cards, hardware versions, etc. The method may include determining all or part of these component differences.

For example, in some embodiments, during the analysis of the information regarding the configuration diagrams, e.g., during traversal of the configuration diagrams, each component or information representing or relating to each component, may be analyzed to determine any distinctions between otherwise similar or identical components. Note that as mentioned above, these sub-component differences may be between hardware, software, data, e.g., configuration data, and/or any other aspect of the respective components. Thus, for example, if the two configuration diagrams each included a GPIB chassis, the method may determine that the two GPIB chassis include different modules. As another example, two otherwise similar or identical programmable hardware elements may have different versions of a hardware configuration program deployed, and so the method may analyze information related to the configuration of each programmable hardware element to determine and compare the versions. As yet another example, two programs may be compared or "diffed" to determine differences in source code between the two programs. Note that in various embodiments, differences between programs included in the first and second systems may include differences in one or more of: software versions, number and types of programs, sub-components of the programs, source code of the programs, deployment of the programs, and configuration of the programs.

In one embodiment, at least a subset of the first plurality of nodes and/or at least a subset of the second plurality of nodes may be interconnected. Thus, the differences between the first configuration diagram and the second configuration diagram may include differences in interconnectivity of components comprised in the first and second systems. Note that depending on the nature of the systems represented by the configuration diagrams, the differences in interconnectivity of components included in the first and second systems may include differences in one or more of: physical connectivity between components, e.g., network topology, cables, wireless means, etc., data flow between components, signal flow between components, control flow between components, dependencies between components, and calling relationships between components (e.g., programs), among others.

Note that these examples are meant to be exemplary only, and are not intended to limit the contemplated differences discernable by the method to any particular type.

In one embodiment, the differences and/or matches may be determined in accordance with specified criteria or guidelines. In other words, analyzing the first and second information to determine differences and/or matches between the configuration diagrams may be performed in accordance with specified difference and/or match criteria, such as, for example, difference/match tolerance levels, category or type, cost, and performance, among others. For example, a tolerance criterion may specify that different versions of the same software programs are not to be considered different, i.e., are to be considered a match. In one approach, a difference or matching score may be computed, e.g., based on similarities or differences between the components, where exceeding a tolerance threshold may determine whether two components match. This threshold may be set to reflect a specified tolerance.

As another example, category criteria may specify that only hardware (and/or software, and/or configuration information, is to be considered. As another example of category criteria based on functionality, components with similar functionality may be considered a match, e.g., two different types of oscilloscope, data acquisition card, signal generator, etc. Cost criteria may specify cost-related aspects of components that may have bearing on the determined differences and/or matches. Similarly, performance criteria may specify what constitutes a differences and/or match based on functional performance of components, where performance may refer to any type of performance-related metric, such as, for example, speed, throughput, memory-size, CPU clock-speed, and so forth. The criteria or guidelines may be stored on the host computer system or a device coupled to the host system over a network. In some embodiments, the criteria may be specified by the user. Thus, the method may include receiving user input specifying the difference and/or match criteria, e.g., via a graphical user interface (GUI).

As another example, the user may specify a particular view, e.g., hardware, software, and/or configuration information, to which the analysis may be directed. Thus, for example, if the user (or a default setting) specifies a software view, the analysis may only consider software components of the systems. Similarly, if a hardware view is specified, the analysis may only consider hardware components of the systems.

As a further example, the user may specify some portion of the configuration diagram for the analysis, where only the specified portion may be compared to the actual system. For example, the user may select components (and/or interconnections) by clicking on them with a pointing device, e.g., a mouse, by drawing a selection rectangle (or other shape) around the portion, or otherwise indicating the portion to be analyzed (diffed and/or merged). Thus, for example, the present method may be selectively applied to sub-systems as desired, which may be of benefit when working with complex systems.

As described in detail below, in some embodiments, the determined differences and/or matches may be determined via and represented by a configuration diagram representing at least a subset of the union of the two systems and indicating the determined differences and/or matches. In other words, in some embodiments, a merged configuration diagram may be generated representing a "merged" system comprising at least a subset of a union (in the set-theoretic sense) of the respective components of the first system and the actual system.

In some embodiments, the user may specify a tolerance for the determination of matches and differences between components, which may in turn determine whether two similar components in the two diagrams should be considered a match or not. For example, the user may specify that in cases where two hardware components (each from or represented in a respective configuration diagram) are identical but for software (e.g., including firmware and/or hardware configuration programs), the hardware components are considered a match. However, in some embodiments, the analysis may determine software differences between the two original components, optionally in response to user input, e.g., by right-clicking on the component icon. As another example, the user may specify that the process not distinguish between software versions.

In one approach, a difference or matching score may be computed, e.g., based on similarities or differences between the components, where exceeding a tolerance threshold may determine whether two components match. This threshold may be set to reflect a specified tolerance. Thus, in various embodiments, the user may specify a tolerance level or schema regarding matches and differences between components represented in the configuration diagrams.

More generally, in various embodiments, the user may specify various criteria, e.g., tolerance levels, priority, or schema regarding differences between components of the first system and the actual system, and the differences may be determined in accordance with the criteria.

In 508, an indication of the determined differences between the first and second configuration diagrams may be displayed on a display device, e.g., a computer monitor, printer, etc. There are numerous ways in which the determined differences may be displayed or indicated, any of which may be used to display the differences. For example, in one embodiment, a "difference" configuration diagram may be displayed that includes only those nodes and connections not common to both configuration diagrams. In another embodiment, a configuration diagram may be displayed that displays at least a subset of a set union or "merge" of the component/resource nodes of the two configuration diagrams, where the nodes and/or connections are graphically displayed to indicate whether they are common to both diagrams, and/or if not common, to which system they belong, e.g., by highlighting, color, outline, style, labels, etc. In other words, nodes and/or connections common to both configuration diagrams, and/or those exclusive to each configuration diagram may be graphically displayed in such as way as to distinguish between them. Thus, in some embodiments, the configuration diagrams may be merged to generate a merged configuration diagram, and the results displayed. Further details of configuration diagram merging are provided below with reference to FIG. 6.

In some embodiments, the determined differences may be indicated textually, e.g., as lists or tables of components and optionally, their connectivity. For example, names of components (and optionally, connectivities) may be grouped according to their configuration diagram affiliation, including a "common" group comprising those common to both configuration diagrams. Any other means of displaying the differences between the configuration diagrams are also contemplated, including, for example, combinations of textual and graphical representations of the differences.

Thus, in various embodiments, displaying an indication of the differences on a display device may include one or more of: displaying a textual description of each of said differences, displaying at least one of said first and second configuration diagrams and highlighting at least a subset of the differences between said first and second configuration diagrams, and displaying a merged configuration diagram comprising at least a subset of a union of the first and second configuration diagrams and highlighting (or otherwise graphically indicating) the differences and/or matches between the first system and the actual system.

The determined differences and/or matches may be used for any of a variety of purposes. For example, the as noted above, the first configuration diagram may comprise a desired system specification, and the second configuration diagram may represent an actual system, where user of the actual system may wish to modify the actual system in accordance with the specification. In some embodiments, the determined differences and/or matches may be used to place an order for any components needed to bring the actual system into accordance with the specification, i.e., the configuration diagram, and/or to acquire missing components directly, e.g., via downloading from a server system. Thus, the method of FIG. 5 may further include providing means for enabling the user to acquire needed but missing components for the actual system.

For example, in one embodiment, software executing on a client computer system, e.g. the users computer system, and/or software executing on a server computer, e.g. coupled to the client computer, may analyze the determined differences and may automatically initiate acquisition and/or purchase of the missing (one or more) components. In one embodiment, the software may automatically order the components without user input, e.g., via the network (e.g., the Internet), for example, if the user's billing or payment information (e.g., credit card number, credit account number, etc.) is already stored or available to the software. In other words, the system may comprise an e-commerce system that automatically (or at user initiation) orders and purchases the needed components based on the determined differences. In other embodiments, the user may be presented with a GUI, e.g., displayed on the client system and provided by the server and/or the client system, prompting the user for input regarding completion of the actual system. For example, the GUI may display the first configuration diagram, e.g., highlighting those components that are missing in the actual system, and may prompt the user with a "Complete the system?" message or equivalent. In response to a positive answer from the user, a search for and/or order of the missing components may then be performed. For example, one or more quotes for each missing component may be presented to the user, including, for example, cost, vendor, delivery times, and/or any other information useful for making a purchase decision, where the quotes may be retrieved from a database, via a network search engine, or any other source of quote information. As another example, the user may click on each of the missing components in the diagram, thereby invoking respective options related to that component, such as, for example, searching for similar components, ordering the component, etc. The GUI may also facilitate user entry or specification of payment information for acquiring the components where necessary. Note that in some cases, one or more of the needed components may be free, e.g., software components available for download from a server, etc.

Where multiple versions of a component are available, selection or priority criteria, possibly specified by the user, may be used to select among the possible components. The selection criteria may specify desirable attributes such as cost, performance, manufacturer/vendor, delivery time and/or means, and so forth, which may guide in the selection of the components.

In other embodiments, at least some user input may be required to acquire the components. For example, in one embodiment, the client computer system may contact a server computer system to acquire the desired components. In one embodiment, a GUI may be presented to the user on a display device of the client computer system (e.g., possibly the GUI of 506 and/or 508 above), where the GUI may be provided by the client computer system and/or by the server. In one embodiment, the user may specify which components are needed, although in other embodiments, the GUI may indicate to the user which components (or component types) are needed by the actual system to bring it into compliance with the specification, i.e., the configuration diagram.

Thus, the GUI may present user-selectable options for acquiring the components. As one example, the GUI may simply provide a list of the needed components (possibly numerous versions of each) and contact information for sources or vendors of the components, e.g., names, addresses, telephone numbers, websites or URLs, and so forth. As another example, the GUI may present various ordering options and/or means for acquiring the components, including, for example, user-selectable links for placing orders over a network, e.g., the Internet, or for downloading software and/or data. In some embodiments, the GUI may present information to help the user select components, such as, for example, cost, vendor, manufacturer, technical specifications, order fulfillment times, and so forth. The GUI may also facilitate user entry of payment, billing, or account information needed to purchase the components, as mentioned above.

In some embodiments, the method (e.g., the server) may automatically determine the sources for candidate components by accessing an internal or external database, or by searching a network, e.g., the Internet, where, as noted above, specified selection or priority criteria may be used to guide the search. The user may be prompted to approve or initiate a suggested order or purchase, or to select from candidate components, after which the order may be placed, and the component delivered for inclusion in the actual system. For example, in one embodiment, if the component is a software program or configuration data, the server (or another external server system) may download the component directly to the client computer system, from which the component may be deployed to the actual system. As another example, if the actual system (which may include the client computer system) is networked to the server, the server may automatically download and deploy the component to or on the actual system. In another embodiment, the server (or another system) may download the component to the client computer system, and the client computer system may automatically deploy the component to the actual system, e.g., possibly using installation software downloaded with the component. Thus, the system may be operable to determine missing components, order and purchase the components, and deploy the components to the actual system, e.g., in order to bring the actual system into compliance with the configuration diagram.

It should be noted that in some embodiments, the search may not be performed solely on the basis of each required individual component. For example, a subset of a system may be represented by a graph structure, and successive, expanding, subsets of the system may be queried for in the database(s). This user may thus be able to purchase a sub-system based on the ability of a vendor to have available a connected subset of a system. Similarly, pricing and other information (e.g., a quote) may be provided for specified subsets of the system.

The user may purchase the different components from different vendors. As noted above, some of the components may be available for free or download via a network connection. For example, the user may require driver software and may be able to freely download it and update his actual system. In some cases, the user may have on hand some of the newly identified missing components, and so may mark these components for exclusion in the search operation to obtain a quotation.

In one embodiment, if the search is unable to find an exact match, a vendor (e.g., software operating on a vendor server and/or a human operator, may determine that a modified version of the desired component or subsystem may be created for the user, and may present this modified solution for consideration by the user. The vendor may set thresholds for matching in order to be notified when such requests are made. The vendor may be able to manually respond to the request by the user in this case where a database query alone may not have resulted in provision of a valid quotation to the user.

If the component includes hardware, the component may be delivered via any physical means, e.g., mail, special delivery, etc., after which the user (or someone else) may deploy the component to the actual system. Thus, one or more of the missing components may be acquired, e.g., via download from the server (or a different server), e.g., for software, data, etc., and/or via more physical means, such as delivery via any of various delivery or postal means, e.g., for hardware and/or software/data, etc.

Figure 6:
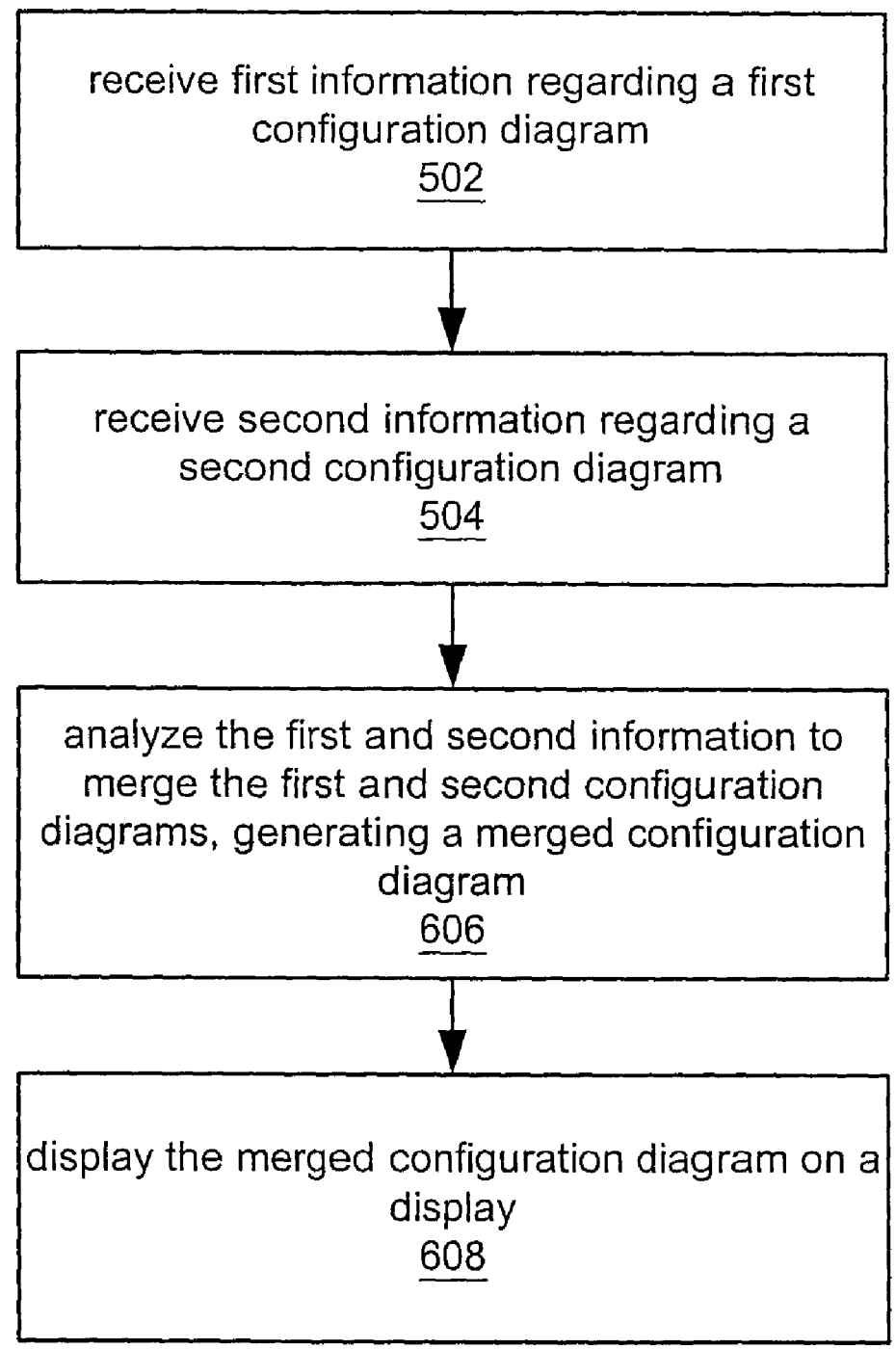
FIG. 6 is a flowchart diagram illustrating one embodiment of a method for merging configuration diagrams.

FIG. 6—Method for Merging Configuration Diagrams

FIG. 6 illustrates a computer-implemented method for merging configuration diagrams, according to one embodiment. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that where method elements are essentially the same as those in the method of FIG. 5, the descriptions may be abbreviated. As shown, this method may operate as follows.

First, in 502, information regarding a first configuration diagram may be received, where the first configuration diagram represents a first system. As indicated in 504, information regarding a second configuration diagram may also be received, where the second configuration diagram represents a second system. As noted above with reference to FIG. 5, the information regarding the first and second configuration diagrams may be any type of information related to or characterizing the configuration diagrams and/or the represented systems, including the configuration diagrams themselves, and/or abstract representations specifying the plurality of interconnected nodes, and optionally, component or resource attributes, e.g., identification, configuration data, version information, descriptions, and so forth. Thus, the information for each configuration diagram may include information related to the corresponding system's components or resources, and may optionally include information regarding the connectivity or associations between the system components or resources.

In 606, the first and second information received in 502 and 504 above may be analyzed to merge the first and second configuration diagrams, thereby generating a merged configuration diagram. The merged configuration diagram may represent a "merged" system comprising at least a subset of a union (in the set-theoretic sense) of the respective components of the first and second systems.

In some embodiments, analyzing the first and second information to merge the first configuration diagram and the second configuration diagram may include analyzing and merging one or more of: matches and differences between hardware devices comprised in the first and second systems, matches and differences between programs comprised in the first and second systems, and matches and differences between configuration data comprised in the first and second systems.

As an example of hardware differences, in an example application where each configuration diagram includes a PXI chassis, but where, e.g., the PXI chassis of the first configuration diagram includes two instrument boards or instrument cards, and the PXI chassis of the second configuration diagram includes three instrument boards or instrument cards, the method may analyze the sub-components of the PXI chassis, and determine that the number and/or types of the boards or cards in the chassis differ.

Similar to the method of FIG. 5, in some embodiments, matches and differences between programs comprised in the first and second systems may include matches and differences in one or more of: software versions, number and types of programs, sub-components of the programs, source code of the programs, deployment of the programs, and configuration of the programs, among others.

In embodiments where at least a subset of the first plurality of nodes and/or at least a subset of the second plurality of nodes are interconnected, the determined matches and differences between the first configuration diagram and the second configuration diagram may also include matches and differences in interconnectivity of components comprised in the first and second systems, which, depending on the nature of the represented systems, may include matches and differences in one or more of: physical connectivity between components, data flow between components, signal flow between components, dependencies between components, and calling relationships between components.

The analysis and merging of the first and second configuration diagrams may be performed in any of a variety of ways. For example, as with the method of FIG. 5, in one embodiment, the configuration diagrams, or representations thereof, may be traversed or "walked", to enumerate their respective components and connections, e.g., if the configuration diagrams are represented by respective graphs (nodes and edges), each graph may be traversed, where each node and connection is recorded, e.g., in respective lists. The resulting lists may then be analyzed and compared, e.g., removing redundancies between the two lists, and the merged configuration diagram generated based on the results. Thus, in some embodiments, the analyzing may include creating one or more data structures which include information regarding the first plurality of nodes in the first configuration diagram and the second plurality of nodes in the second configuration diagram. Determining matches and differences may then include comparing the one or more data structures to determine the matches and differences. Thus, the one or more data structures may each comprise directed graphs comprising a plurality of vertices connected by edges, where each of said vertices represents one of the nodes in a respective one of the first and second configuration diagrams.

In another embodiment, the merged configuration diagram may be generated as the first and second diagrams are traversed or walked, obviating the intermediate lists. For example, each configuration diagram may be traversed at least partially to determine a common component or resource, and then both diagrams may be traversed starting with the common component in each. The method may then walk the respective configuration diagrams (or representations, e.g., graphs, data structures, etc.), adding and connecting components in a new configuration diagram (the merged configuration diagram) corresponding to those encountered in the traversals of the first and second configuration diagrams. Note that where the same components are encountered in the first and second configuration diagrams, only one corresponding component may be added to the merged configuration diagram, thereby avoiding redundancies in the merged configuration diagram.

In some embodiments, the information received in 502 and 504 above may comprise lists of components or resources, as well as lists of connections between the components or resources. The analysis may then include analyzing and merging the lists, then generating the merged configuration diagram based on the merged list. Of course, depending upon the type and form of the received information, any other type of comparison and analysis may be made as appropriate to generate the merged configuration diagram.

In some embodiments, the merged configuration diagram may be generated by modifying the first or second configuration diagram, i.e., adding any "different" nodes and/or connections to the configuration diagram, where the affiliation of each of the nodes and/or connections may be indicated, e.g., the first or second configuration diagram. In some embodiments, a temporary third configuration diagram may be produced and used to update or modify the first or second configuration diagram.

For example, in one embodiment, when performing the merge operation the user may first presented with a list of differences between the two diagrams. The user may select one of the first or second diagrams as the "basis" or starting point for the merged configuration diagram. This may be selected automatically (or be suggested to the user) based on the diagram requiring the least changes to create the merged diagram.

As an example application, the first diagram may be a configuration diagram that defines a temperature monitoring system configured to sample the temperature at 5 measurements/second. The second diagram may be a temperature monitoring and control system, where additional hardware is required but the sampling rate is 2 measurements/second, in which case the second diagram may be suggested based on the sample rate. Note that the calculation of "least changes" may be somewhat complex or subtle. For example, in one embodiment, the method may weight different aspects of the differences (configurable by a user), where configuration changes may be considered less work then replacing hardware components or altering device or network connections. Once the "basis" diagram is selected it may serve as a starting point for creation of the merged configuration diagram, where the merged diagram visually highlights the areas in conflict between the original two diagrams.

Alternatively, the merged configuration diagram may be generated as a new configuration diagram. In some embodiments, the method may include receiving user input specifying the generation of the merged configuration diagram. For example, the user may specify that the first configuration diagram is to be modified to generate the merged diagram.

For example, assume that the user selects the first diagram to be the basis. For nodes that are unique to the second diagram an icon may be added to the merged diagram to indicate completely new entities not present in the basis that should be considered. The user may select one or more of the highlighted differences in the merged configuration diagram and may initiate application of the changes from either the first or the second diagram. Applying such changes between the first or second diagram may result in the original graph structure and connections becoming invalid. In these cases the user may be provided with additional help to resolve these broken links.

In some embodiments, e.g., the merged configuration diagram may be generated in accordance with user-specified criteria or guidelines. In other words, analyzing the first and second information to determine differences and/or matches between the configuration diagrams may be performed in accordance with specified difference and/or match criteria, examples of which are described above with reference to the method of FIG. 5. In some embodiments, the criteria may be specified by the user. Thus, the method may include receiving user input specifying the difference and/or match criteria, e.g., via a graphical user interface (GUI).

As also described above with reference to the method of FIG. 5, in another example, the user may specify a particular view, e.g., hardware, software, and/or configuration information, to which the merged diagram may be directed. Thus, for example, if the user (or a default setting) specifies a software view, the merged configuration diagram may only include or represent software components of the merged system. Similarly, if a hardware view is specified, the merged configuration diagram may only include or represent hardware components of the merged system.

As also described above, in some embodiments, the user may specify some portion of the configuration diagram for the analysis, where only the specified portion may be compared to the actual system, e.g., the user may select components (and/or interconnections) by clicking on them with a pointing device, e.g., a mouse, by drawing a selection rectangle (or other shape) around the portion, or otherwise indicating the portion to be analyzed (diffed and/or merged), and so the method may be selectively applied to sub-systems, which may be beneficial when working with complex systems.

In some embodiments, the user may specify a tolerance for the determination of matches and differences between components, which may in turn determine whether two similar components in the two diagrams should be merged into a single component in the merged diagram. For example, the user may specify that in cases where two hardware components (each from or represented in a respective configuration diagram) are identical but for software (e.g., including firmware and/or hardware configuration programs), the merged configuration diagram may only include one corresponding hardware component. However, as noted above with reference to the method of FIG. 5, in some embodiments, the merged configuration diagram may include information indicating the software differences between the two original components, e.g., text displayed adjacent to the component icon in the diagram, optionally in response to user input, e.g., right-clicking on the component icon, or, as another example, the user may specify that the process not distinguish between software versions.

Similar to that described above with reference to the method of FIG. 5, in one approach, a difference or matching score may be computed, e.g., based on similarities or differences between the components, where exceeding a tolerance threshold may determine whether two components match. This threshold may be set to reflect a specified tolerance. Thus, in various embodiments, the user may specify a tolerance level or schema regarding matches and differences between components represented in the configuration diagrams.

More generally, as noted above with reference to FIG. 5, in various embodiments, the user may specify various criteria, e.g., tolerance levels, priority, or schema regarding differences between components of the first system and the actual system, and a merged configuration diagram may be generated in accordance with the criteria. The merged configuration diagram may then be generated in accordance with the specified criteria. Note that these criteria described above with respect to generation of the merged configuration diagram may also be applied in embodiments where the differences and/or matches are determined but no merged configuration diagram is generated.

In one embodiment, undo and redo functionality for the diff/merge processes described above may be provided. For example, user interactions and responsive actions performed by the system and method described herein, collectively referred to as "actions", may be recorded, e.g., in a stack or other data structure, in the order performed, allowing the user to undo or retract actions in reverse order from that of their performance. This recorded sequence of actions may also be used to provide redo functionality, where actions or events undone by the undo functionality may be redone as desired.

Note that in various embodiments, the actions may be recorded as respective state information describing the state of the diffed/merged configuration diagram(s) before and/or resulting from the action. For example, in one embodiment, each stored action may have an associated "diff" record, indicating the change of state of the diffed/merged corresponding to each action. In another embodiment, backup copies of the configuration diagram(s), and/or auxiliary information, e.g., diff/merge configuration information, corresponding to each recorded action may be stored.

In yet another embodiment, the actions may be recorded as respective information whereby the system may access the functions that perform the actions and/or inverse functions for undoing the actions, e.g., function codes or pointers, and operands of the functions. Note that in various embodiments, the undo/redo functionality may apply to any actions of the diff/merge process as desired, including configuration steps, etc. The information stored for each recorded action may be referred to as diff/merge information. Further information regarding one embodiment of undo/redo functionality may be found in U.S. Pat. No. 5,990,906 titled "Undo Feature for a Graphical Programming System", which was incorporated by reference above.

In 608, the generated merged configuration diagram may be displayed on a display device, e.g., a computer monitor, printer, etc. There are numerous ways in which the merged configuration diagram may be displayed, any of which may be used as desired. For example, as indicated above with reference to FIG. 5, in one embodiment, the merged configuration diagram may be displayed where nodes and/or connections common to both configuration diagrams, and/or those exclusive to each configuration diagram may be graphically displayed in such as way as to distinguish between them, e.g., via color, line-style, labels, and so forth.

In some embodiments, the merged configuration diagram may be indicated textually, e.g., as lists or tables of components and optionally, their connectivity. For example, names of components (and optionally, connectivity) may be grouped according to their configuration diagram affiliation, including a "common" group comprising those common to both configuration diagrams. Any other means of displaying the merged configuration diagram are also contemplated, including, for example, combinations of textual and graphical representations. For example, displaying the merged configuration diagram may also include graphically indicating the matches and differences between the first and second configuration diagrams in the merged configuration diagram, and/or displaying a textual description of matches and differences between the first and second configuration diagrams. In one embodiment, graphically indicating the matches and differences between the first and second configuration diagrams in the merged configuration diagram may include highlighting the differences between the first and second configuration diagrams in the merged configuration diagram.

Note that the merged configuration diagram may be used for any of a variety of purposes, including any of those described above with respect to the determined differences and/or matches of FIG. 5, including facilitating the search for, and optional ordering and purchasing of missing components required to complete one or both of the systems represented by the configuration diagrams, as described in detail above.

Figure 7:
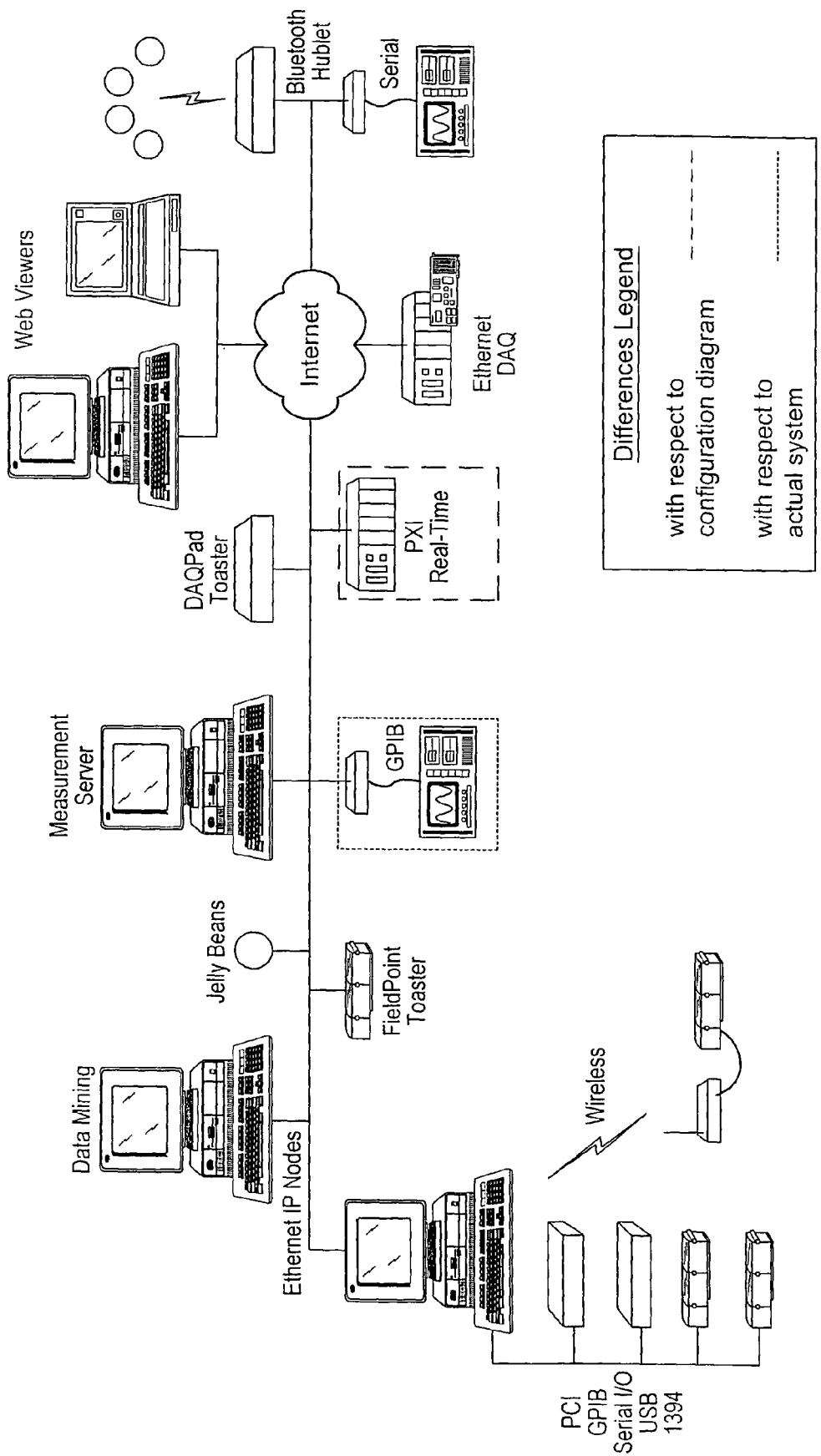
FIG. 7 illustrates an exemplary merged configuration diagram, according to one embodiment.

FIG. 7—Example Merged Configuration Diagram

FIG. 7 illustrates one embodiment of a merged configuration diagrams for representing differences and/or matches between the configuration diagram representing the first system, and an actual system. More specifically, FIG. 7 illustrates an embodiment where a configuration diagram similar to that of FIG. 4F has been compared to an actual system, and the differences presented in a merged configuration diagram, according to one embodiment.

As FIG. 7 shows, this example merged configuration diagram is directed to a distributed hardware system using a broad variety of hardware devices or components. The merged configuration diagram may be generated as part of the comparison method described above in FIG. 5, e.g., in method elements 506 and/or 508, or as part of the method of FIG. 6, e.g., in method element 606. In this particular case, the configuration diagram representing the first system and the actual system differ in their respective components in that the configuration diagram includes a GPIB device which the actual system does not, whereas the actual system includes a PXI Real-Time chassis which the configuration diagram does not. These differences are indicated in the merged configuration diagram via dashed lines outlining the components not common to both systems. Note that in this exemplary embodiment, the two differences are denoted and distinguished by respective dashed line-styles, where the long-dashed line indicates that the component (the GPIB device) is included in the configuration diagram (e.g., in the first system) but missing from the actual system, and the short-dashed line indicates that the component (the PXI chassis) is included in the actual system, but missing from the configuration diagram. In other words, as the differences legend indicates, the different dashed lines indicate from which system (the first system represented by the configuration diagram or the actual system) the component is missing (or different).

Thus, a user may quickly ascertain from the merged configuration diagram of FIG. 7 where the two systems differ, and may then decide whether the differences require modification of the actual system (or the system specified by the configuration diagram, i.e., the first system). Of course, as described above, in other embodiments, the differences may be indicated in any of a variety of ways, including, for example, using graphical indications such as highlighting, color, outline, style, labels, and so forth, or textual means, such as tables, lists, descriptions, etc., as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible memory medium storing program instructions for determining differences between configuration diagrams, wherein the program instructions are executable by a processor to perform:

receiving first information regarding a first configuration diagram, wherein the first information is useable to display the first configuration diagram on a display device, wherein the first configuration diagram comprises a first plurality of interconnected nodes, wherein the first configuration diagram graphically represents a first system, wherein two or more nodes of the first plurality of nodes comprise device nodes that represent respective hardware devices in the first system, wherein at least one connection between the two or more device nodes represents a physical connection between the respective hardware devices in the first system, wherein the first configuration diagram further comprises one or more first program nodes that correspond respectively to one or more first programs in the first system, wherein the one or more first programs are stored on a first device, and wherein the one or more first program nodes are displayed proximate to a first device node that corresponds to the first device to visually indicate that the one or more first programs are stored on the first device;

receiving second information regarding a second configuration diagram, wherein the second information is useable to display the second configuration diagram on the display device, wherein the second configuration diagram comprises a second plurality of interconnected nodes, wherein the second configuration diagram graphically represents a second system, wherein two or more nodes of the second plurality of interconnected nodes comprise device nodes that represent respective hardware devices in the second system, wherein at least one connection between the two or more device nodes represents a physical connection between the respective hardware devices in the second system, wherein the second configuration diagram further comprises one or more second program nodes that correspond respectively to one or more second programs in the second system, wherein the one or more second programs are stored on a second device, and wherein the one or more second program nodes are displayed proximate to a second device node that corresponds to the second device to visually indicate that the one or more second programs are stored on the second device;

analyzing the first and second information to determine differences between the first configuration diagram and the second configuration diagram; and displaying an indication of the differences on the display device.

2. The non-transitory memory medium of claim 1, wherein at least a subset of the nodes of the first configuration diagram and at least a subset of the nodes of the second configuration diagram correspond respectively to configuration data.

3. The non-transitory memory medium of claim 1, wherein the differences between the first configuration diagram and the second configuration diagram comprise one or more of:
  differences between hardware devices comprised in the first and second systems;
  differences between programs comprised in the first and second systems; or
  differences between configuration data comprised in the first and second systems.

4. The non-transitory memory medium of claim 3, wherein the differences between the first configuration diagram and the second configuration diagram further comprise:
  differences in interconnectivity of components comprised in the first and second systems.

5. The non-transitory memory medium of claim 4, wherein said differences in interconnectivity of components comprised in the first and second systems comprise differences in one or more of:
  physical connectivity between components;
  data flow between components;
  signal flow between components;
  dependencies between components; or
  calling relationships between components.

6. The non-transitory memory medium of claim 3, wherein said differences between hardware devices comprised in the first and second systems comprise differences in one or more of:
  number and types of the hardware devices;
  sub-components of the hardware devices; or
  configuration of the hardware devices.

7. The non-transitory memory medium of claim 3, wherein said differences between programs comprised in the first and second systems comprise differences in one or more of:
  software versions;
  number and types of programs;
  sub-components of the programs;
  source code of the programs;
  deployment of the programs; or
  configuration of the programs.

8. The non-transitory memory medium of claim 1, wherein the information regarding the first configuration diagram comprises one or more of:
  the first configuration diagram;
  a graph of the first configuration diagram;
  a description of the first configuration diagram; or
  a data structure specifying the first configuration diagram.

9. The non-transitory memory medium of claim 1, wherein said analyzing the first and second information to determine differences between the first configuration diagram and the second configuration diagram comprises:
  traversing the first configuration diagram and the second configuration diagram to determine the differences.

10. The non-transitory memory medium of claim 1, wherein said displaying an indication of the differences on a display device comprises one or more of:
  displaying a textual description of each of said differences;
  displaying at least one of said first and second configuration diagrams and highlighting at least a subset of the differences between said first and second configuration diagrams; or
  displaying a merged configuration diagram comprising at least a subset of a union of the first and second configuration diagrams and graphically indicating the differences between the first and second configuration diagrams.

11. The non-transitory memory medium of claim 1, wherein said analyzing comprises:
  creating one or more data structures which include information regarding the first plurality of interconnected nodes in the first configuration diagram and the second plurality of interconnected nodes in the second configuration diagram;
  wherein said determining differences comprises comparing the one or more data structures to determine the differences.

12. The non-transitory memory medium of claim 11, wherein the one or more data structures each comprises a directed graph comprising a plurality of vertices connected by edges, wherein each of the vertices represents one of the nodes in a respective one of the first and second configuration diagrams.

13. The non-transitory memory medium of claim 1, wherein the first system comprises an actual system comprising a plurality of components, and wherein said receiving first information regarding the first system comprises:
  querying the first system to determine the plurality of components; and
  receiving the first information regarding the first system in response to said querying.

14. The non-transitory memory medium of claim 1, wherein the second system comprises an actual system comprising a plurality of components, and wherein said receiving second information regarding the second system comprises:
  querying the second system to determine the plurality of components; and
  receiving the second information regarding the second system in response to said querying.

15. The non-transitory memory medium of claim 1, wherein said analyzing the first and second information to determine differences and/or matches between the first configuration diagram and the second configuration diagram is performed in accordance with specified difference and/or match criteria.

16. The non-transitory memory medium of claim 15, wherein specified difference and/or match criteria comprise one or more of:
  tolerance;
  category;
  cost;
  performance; or
  specified subsets of the first and second configuration diagrams for said analyzing.

17. The non-transitory memory medium of claim 15, wherein the program instructions are further executable by a processor to perform:

receiving user input specifying the difference and/or match criteria.

18. The non-transitory memory medium of claim 17,
wherein the user input specifying the difference and/or match criteria comprises user input specifying a portion of the first and/or second configuration diagrams to analyze; and
wherein said analyzing and said displaying are performed with respect to the specified portion of the first and/or second configuration diagrams.

19. The non-transitory memory medium of claim 18, wherein the program instructions are further executable by a processor to perform:
receiving user input initiating said analyzing and said displaying, wherein said analyzing and said displaying are performed in response to said initiating.

20. The non-transitory memory medium of claim 19, wherein the program instructions are further executable by a processor to perform:
storing diff/merge information for each of a plurality of actions performed by the user and/or by the memory medium; and
receiving user input invoking one or more undo operations based on the stored diff/merge information, wherein the one or more undo operations correspond respectively to one or more of the plurality of actions.

21. The non-transitory memory medium of claim 20, wherein the program instructions are further executable by a processor to perform:
receiving user input invoking one or more redo operations based on the stored diff/merge information, wherein the one or more redo operations correspond respectively to one or more of the one or more undo operations.

22. The non-transitory memory medium of claim 1, wherein the first configuration diagram comprises a specification for a desired system, wherein the second system comprises an actual system, and wherein said displaying indicates one or more components represented in the first configuration diagram but missing from the actual system, wherein the program instructions are further executable by a processor to perform:
searching for the one or more components based on the indicated one or more components, wherein the one or more components are operable to be included in the actual system.

23. The non-transitory memory medium of claim 22, wherein the program instructions are further executable by a processor to perform:
indicating the one or more components on the display device.

24. The non-transitory memory medium of claim 22, wherein the program instructions are further executable by a processor to perform:
initiating acquisition of the one or more components.

25. The non-transitory memory medium of claim 24, wherein the program instructions are further executable by a processor to perform:
receiving payment information for purchase of the one or more components.

26. The non-transitory memory medium of claim 24, wherein said initiating acquisition of the one or more components is performed:
automatically; or
in response to user input requesting purchase of the one or more components.

27. The non-transitory memory medium of claim 24, wherein the program instructions are further executable by a processor to perform:
downloading one or more software components to a client computer system for deployment to the actual system.

28. The non-transitory memory medium of claim 27, wherein the program instructions are further executable by a processor to perform:
automatically deploying the one or more software components to the actual system.

29. The non-transitory memory medium of claim 24, wherein the program instructions are further executable by a processor to perform:
automatically arranging delivery of the one or more components for inclusion in the actual system.

30. The non-transitory memory medium of claim 1, wherein said analyzing and said displaying an indication of the differences on a display device are performed:
automatically; or
in response to user input requesting said analyzing.

31. The non-transitory memory medium of claim 1, wherein the first system and the second system each comprises one or more of:
an industrial automation system;
a process control system; or
a test and measurement system.

32. The non-transitory memory medium of claim 1, wherein the program instructions are further executable to perform:
displaying the first configuration diagram on the display device; and
displaying the second configuration diagram on the display device.

33. The non-transitory computer-accessible memory medium of claim 1, wherein said analyzing comprises determining differences in position of a program node comprised in both the first and second configuration diagrams.

34. A system for determining differences between configuration diagrams, the system comprising:
a processor;
a memory medium coupled to the processor; and
a display device;
wherein the memory stores program instructions executable by the processor to:
receive first information regarding a first configuration diagram, wherein the first information is useable to display the first configuration diagram on the display device, wherein the first configuration diagram comprises a first plurality of interconnected nodes, wherein the first configuration diagram graphically represents a first system, wherein two or more nodes of the first plurality of interconnected nodes comprise device nodes that represent respective hardware devices in the first system, wherein at least one connection between the two or more device nodes represents a physical connection between the respective hardware devices in the first system, wherein the first configuration diagram further comprises one or more first program nodes that correspond respectively to one or more first programs in the first system, wherein the one or more first programs are stored on a first device, and wherein the one or more first program nodes are displayed proximate to a first device node that corresponds to the first device to visually indicate that the one or more first programs are stored on the first device;
receive second information regarding a second configuration diagram, wherein the second information is useable to display the second configuration diagram on the display device, wherein the second configuration diagram comprises a second plurality of interconnected nodes, wherein the second configuration diagram graphically represents a second system, wherein two or more nodes of the second plurality of interconnected nodes comprise device nodes that represent respective hardware devices in the second system, wherein at least one connection between the two or more device nodes represents a physical connection between the respective hardware devices in the second system, wherein the second configuration diagram further comprises one or more second program nodes that correspond respectively to one or more second programs in the second system, wherein the one or more second programs are stored on a second device, and wherein the one or more second program nodes are displayed proximate to a second device node that corresponds to the second device to visually indicate that the one or more second programs are stored on the second device;

analyze the first and second information to determine differences between the first configuration diagram and the second configuration diagram; and display an indication of the differences on the display device.

35. The system of claim 34, wherein said analyzing comprises determining differences in position of a program node comprised in both the first and second configuration diagrams.

36. A system for determining differences between configuration diagrams, the system comprising:

means for receiving first information regarding a first configuration diagram, wherein the first information is useable to display the first configuration diagram on a display device, wherein the first configuration diagram graphically represents a first system, wherein two or more nodes of the first plurality of nodes comprise device nodes that represent respective hardware devices in the first system, wherein at least one connection between the two or more device nodes represents a physical connection between the respective hardware devices in the first system, wherein the first configuration diagram further comprises one or more first program nodes that correspond respectively to one or more first programs in the first system, wherein the one or more first programs are stored on a first device, and wherein the one or more first program nodes are displayed proximate to a first device node that corresponds to the first device to visually indicate that the one or more first programs are stored on the first device;

means for receiving second information regarding a second configuration diagram, wherein the second information is useable to display the second configuration diagram on the display device, wherein the second configuration diagram comprises a second plurality of interconnected nodes, wherein the second configuration diagram comprises a second plurality of interconnected nodes, wherein the second configuration diagram graphically represents a second system, wherein two or more nodes of the second plurality of interconnected nodes comprise device nodes that represent respective hardware devices in the second system, wherein at least one connection between the two or more device nodes represents a physical connection between the respective hardware devices in the second system, wherein the second configuration diagram further comprises one or more second program nodes that correspond respectively to one or more second programs in the second system, wherein the one or more second programs are stored on a second device, and wherein the one or more second program nodes are displayed proximate to a second device node that corresponds to the second device to visually indicate that the one or more second programs are stored on the second device;

means for analyzing the first and second information to determine differences between the first configuration diagram and the second configuration diagram; and means for displaying an indication of the differences on the display device.

37. The system of claim 36, wherein said analyzing comprises determining differences in position of a program node comprised in both the first and second configuration diagrams.

38. A method for determining differences between configuration diagrams, comprising:

utilizing a computer to perform:

receiving first information regarding a first configuration diagram, wherein the first information is useable to display the first configuration diagram on a display device, wherein the first configuration diagram comprises a first plurality of interconnected nodes, wherein the first configuration diagram graphically represents a first system, wherein two or more nodes of the first plurality of nodes comprise device nodes that represent respective hardware devices in the first system, wherein at least one connection between the two or more device nodes represents a physical connection between the respective hardware devices in the first system, wherein the first configuration diagram further comprises one or more first program nodes that correspond respectively to one or more first programs in the first system, wherein the one or more first programs are stored on a first device, and wherein the one or more first program nodes are displayed proximate to a first device node that corresponds to the first device to visually indicate that the one or more first programs are stored on the first device;

receiving second information regarding a second configuration diagram, wherein the second information is useable to display the second configuration diagram on the display device, wherein the second configuration diagram comprises a second plurality of interconnected nodes, wherein the second configuration diagram graphically represents a second system, wherein two or more nodes of the second plurality of interconnected nodes comprise device nodes that represent respective hardware devices in the second system, wherein at least one connection between the two or more device nodes represents a physical connection between the respective hardware devices in the second system, wherein the second configuration diagram further comprises one or more second program nodes that correspond respectively to one or more second programs in the second system, wherein the one or more second programs are stored on a second device, and wherein the one or more second program nodes are displayed proximate to a second device node that corresponds to the second device to visually indicate that the one or more second programs are stored on the second device;

analyzing the first and second information to determine differences between the first configuration diagram and the second configuration diagram; and displaying an indication of the differences on the display device.

39. The method of claim 38, wherein said analyzing comprises determining differences in position of a program node comprised in both the first and second configuration diagrams.

40. A non-transitory computer-accessible memory medium storing program instructions for determining differences between configuration diagrams, wherein the program instructions are executable by a processor to perform:

displaying a first configuration diagram on a display device, wherein the first configuration diagram graphically represents a first system, wherein two or more nodes of the first plurality of nodes comprise device nodes that represent respective hardware devices in the first system, wherein at least one connection between the two or more device nodes represents a physical connection between the respective hardware devices in the first system, wherein the first configuration diagram further comprises one or more first program nodes that correspond respectively to one or more first programs in the first system, wherein the one or more first programs are stored on a first device, and wherein the one or more first program nodes are displayed proximate to a first device node that corresponds to the first device to visually indicate that the one or more first programs are stored on the first device;

displaying a second configuration diagram on the display device, wherein the second configuration diagram comprises a second plurality of interconnected nodes, wherein the second configuration diagram comprises a second plurality of interconnected nodes, wherein the second configuration diagram graphically represents a second system, wherein two or more nodes of the second plurality of interconnected nodes comprise device nodes that represent respective hardware devices in the second system, wherein at least one connection between the two or more device nodes represents a physical connection between the respective hardware devices in the second system, wherein the second configuration diagram further comprises one or more second program nodes that correspond respectively to one or more second programs in the second system, wherein the one or more second programs are stored on a second device, and wherein the one or more second program nodes are displayed proximate to a second device node that corresponds to the second device to visually indicate that the one or more second programs are stored on the second device;

analyzing the first and second configuration diagrams to determine differences between the first configuration diagram and the second configuration diagram; and displaying an indication of the differences on the display device.

41. The method of claim 40, wherein the first system and/or the second system each comprises a measurement system.

42. The non-transitory computer-accessible memory medium of claim 40, wherein said analyzing comprises determining differences in position of a program node comprised in both the first and second configuration diagrams.

\* \* \* \* \*